(12) United States Patent
Roles et al.

(10) Patent No.: US 7,665,071 B1
(45) Date of Patent: Feb. 16, 2010

(54) MANAGEMENT OBJECT MODEL FOR PERFORMING MANAGEMENT OF A COMPUTER SYSTEM

(75) Inventors: Karen C. Roles, Send (GB); Stephen C. Evans, Aylesbury (GB); Steven J. Glover, Richmond (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1132 days.

(21) Appl. No.: 10/733,795

(22) Filed: Dec. 11, 2003

(51) Int. Cl.
*G06F 9/44* (2006.01)

(52) U.S. Cl. .................. 717/130; 717/104; 717/124; 717/127

(58) Field of Classification Search .................. 717/100, 717/120, 121, 130, 131, 158, 104–105, 124, 717/127, 128
See application file for complete search history.

(56) References Cited

U.S. PATENT DOCUMENTS

| | | | | |
|---|---|---|---|---|
| 5,544,288 | A | * | 8/1996 | Morgan et al. .............. 715/801 |
| 5,546,577 | A | * | 8/1996 | Marlin et al. ........... 707/103 R |
| 5,555,370 | A | * | 9/1996 | Li et al. ...................... 715/763 |
| 5,901,315 | A | * | 5/1999 | Edwards et al. ............. 717/124 |
| 5,950,011 | A | * | 9/1999 | Albrecht et al. ............. 717/167 |
| RE36,444 | E | * | 12/1999 | Sanchez-Frank et al. .... 715/839 |
| 6,237,143 | B1 | * | 5/2001 | Fontana et al. .............. 717/127 |
| 6,247,078 | B1 | | 6/2001 | Ebert et al. |
| 6,405,366 | B1 | * | 6/2002 | Lorenz et al. ............... 717/107 |
| 6,452,809 | B1 | | 9/2002 | Jackson et al. |
| 6,556,438 | B1 | | 4/2003 | Bolognia et al. |
| 6,583,989 | B1 | | 6/2003 | Guyer et al. |
| 6,594,150 | B2 | | 7/2003 | Creason et al. |
| 6,654,252 | B2 | | 11/2003 | Raynham |
| 6,742,068 | B2 | | 5/2004 | Gallagher et al. |
| 6,792,460 | B2 | * | 9/2004 | Oulu et al. .................. 709/224 |
| 2002/0124114 | A1 | | 9/2002 | Bottom et al. |
| 2002/0138782 | A1 | | 9/2002 | Durrant et al. |
| 2002/0138791 | A1 | | 9/2002 | Durrant et al. |
| 2003/0023956 | A1 | * | 1/2003 | Dulberg et al. .............. 717/130 |
| 2004/0039745 | A1 | | 2/2004 | Evans et al. |

OTHER PUBLICATIONS

"ASX: An Object-Oriented Frawmework for Developing Distributed Aplications", Douglas C. Schmidt, Apr. 1994, USENIX C++ Conference, pp. 1-17.*
OS/2 Client Server Toolkit, Angelo R. Bobak, 1995, pp. 559-627.*
Focus on OpenView, A Guide to Hewlett-Packard's Network and Systme Management Platform, Nathan Muller, 1995, Chapters 1-5.*
OS/2 Warp Generation, vol. 1: OS/2 Warp Version 3, OS/2 Warp with WIN-OS/2 OS/2 Warp Connect and Bonus Pak, IBM Redbooks, Oct. 11, 1995, Whole Manual.*
IBM, OS/2 Server Transition, Oct. 2003, Whole manual.*

* cited by examiner

*Primary Examiner*—Jason Mitchell
(74) *Attorney, Agent, or Firm*—Meyertons, Hood, Kivlin, Kowert & Goetzel, P.C.

(57) ABSTRACT

A management system is provided for the generation of a management object model for performing management of a computer system. The object model includes a structured hierarchy of objects representing components of a computer system. The management system can include component modules operable to define mappings from instrumentation of the components to objects representing those components and configuration modules operable to configure associations between the component modules for the generation of the management object model.

34 Claims, 19 Drawing Sheets

| FIG. 6A |
| FIG. 6B | they
MANAGEMENT OBJECT MODEL FOR PERFORMING MANAGEMENT OF A COMPUTER SYSTEM

BACKGROUND OF THE INVENTION

The invention relates to management of computer systems.

A collection of resources or components within a system can typically be represented as a hierarchy of objects. Such a representation can be helpful for management, for example for remote management of part or all of the system.

In a complex computer system, that may involve parts of the system being implemented on different platforms, providing efficient interfaces for the management of a potentially large amount of management information becomes difficult, especially in that the management information can relate potentially to a set of different platforms.

The provision of services at one level within the system can be dependent on the status and performance of resources at another level within the system. In the absence of effective modeling of the dependency of service availability on the underlying hardware, the impact of hardware failure predicted by the hardware model cannot be assessed proactively to re-position services ahead of any customer visible outage.

Also, in order to provision a service, knowledge of the underlying resources is needed. Management of this knowledge in an effective manner is desirable to enable efficient utilization of the system resources.

Accordingly, the invention relates to improving access to system management information in a computer system.

SUMMARY OF THE INVENTION

One aspect of the invention provides a management system for generation of a management object model including a structured hierarchy of objects representing components of a computer system for performing management of the computer system. The management system can include component modules operable to define mappings from instrumentation of the components to objects representing those components. It can also comprise configuration modules operable to configure associations between the component modules for the generation of the management object model.

The combination of component modules and configuration modules provides a flexible mechanism for defining an object model in a readily configurable manner.

The component modules can define mappings at respective different levels of abstraction. For example, a component module can define a mapping for a single component property at a first level of abstraction. Another component module can define a mapping for a set of component properties forming an object at a second level of abstraction. A further component module can define a mapping for an assembly of associated objects at a third level of abstraction.

A component module for a component can define a behavior of the object representing the component. A dynamic configuration module can configure a component module dynamically at run time for a component that is subject to dynamic changes in status and can further monitor the component for a change in status. A static configuration module can configure a component module statically at run time for a component having static properties for a given invocation of the computer system. A fixed configuration module, or configuration file, can configure a component module fixedly at run time for a component having fixed properties for any invocation of the computer system.

A component module for a component can identify an instrumentation module defining a source of instrumentation for the component. An instrumentation module can export an object-based representation of the instrumentation data via an instrumentation interface.

An instrumentation module can include a general part (for example a generic part) and a specific part. The general part can communicate with the specific part via a private interface to obtain instrumentation data. The specific part can interface with instrumentation for the component to obtain said instrumentation data. The general part and the specific part can be local to each other. The specific part can alternatively be remote from the general part, the general part being operable to communicate with the remote part via a remote access mechanism.

A library of component modules and/or instrumentation modules can be provided, which component or instrumentation can be used "as is", or can be specialized.

The management system can form part of a management agent for remote management of a computer system.

Other aspects of the invention provide a method generating an object model using such a computer management system and to a computer system operable to implement the method.

Aspects of the invention can be implemented by a computer program product. A computer program product for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

BRIEF DESCRIPTION OF THE DRAWINGS

Embodiments of the present invention will be described hereinafter, by way of example only, with reference to the accompanying drawings in which like reference signs relate to like elements and in which.

Figure 1:
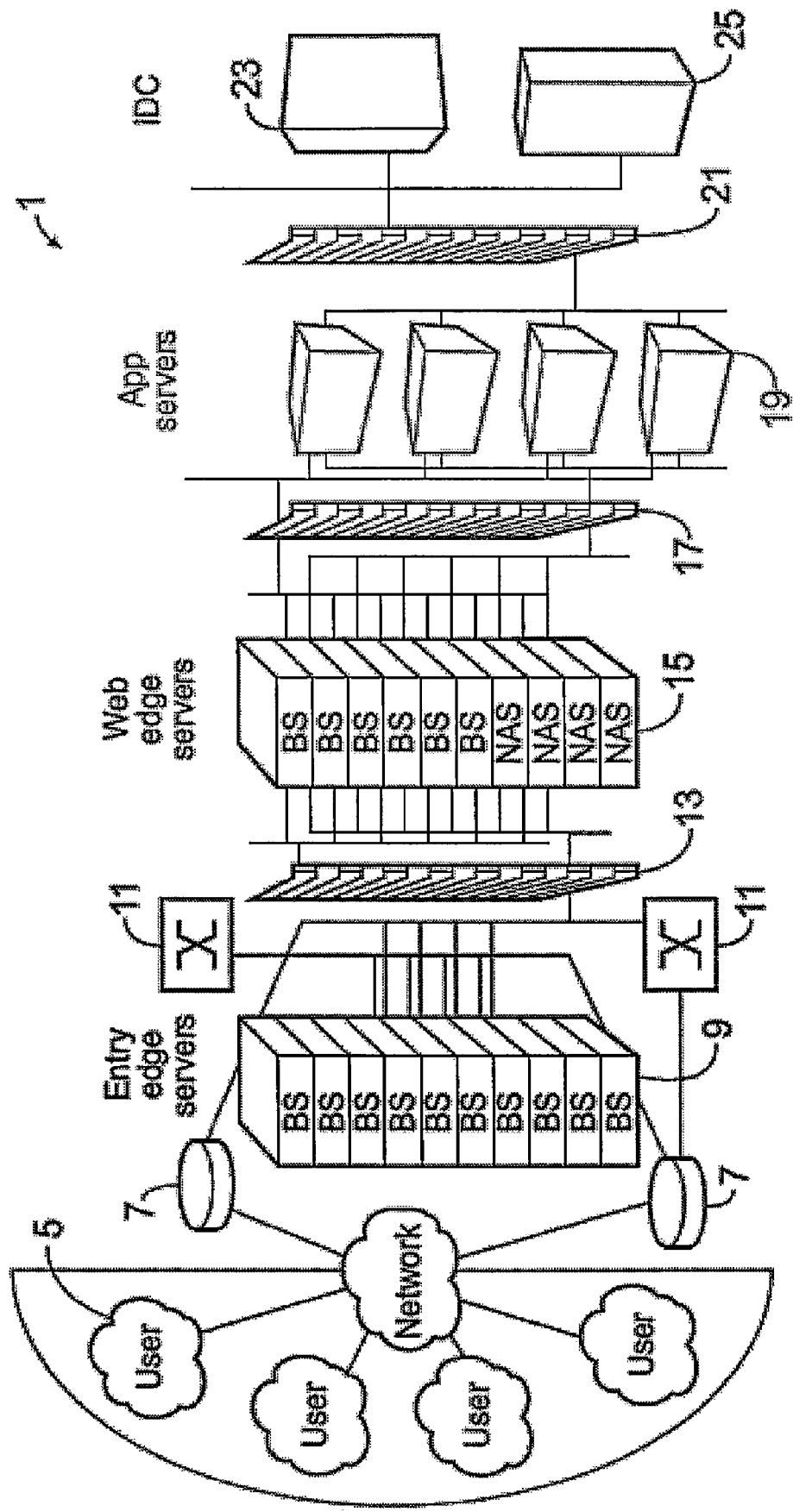
FIG. 1 is a schematic representation of an architecture of a multiprocessor system for supporting a web site.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Shown in FIG. 1 is an example of an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm as shown in FIG. 1. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
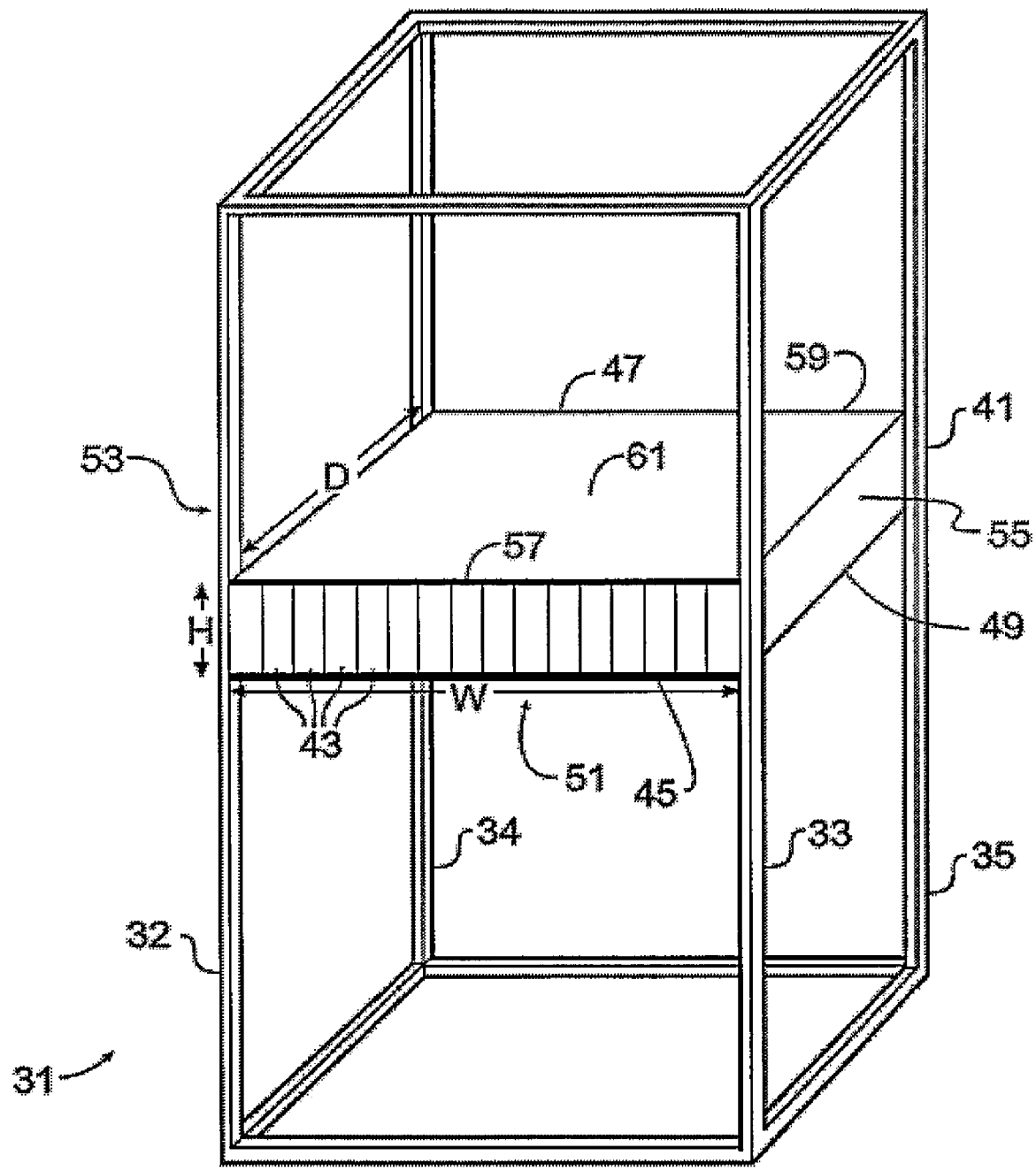
FIG. 2 is a schematic representation of a racking system incorporating an example of a carrier in the form of a rack-mountable shelf according to a first example.

With reference to FIG. 2, there is shown a schematic perspective representation of a rack system 31 as viewed from the front including left and right front uprights 32 and 33 and left and right rear uprights 34 and 35. The uprights can be formed with apertures for receiving shelf fixings (e.g., screws, bolts, clips, etc., for mounting brackets, slides, rails, etc.).

Also shown in FIG. 2 is an example of a blade server shelf 41 mounted in the rack system 31. The shelf 41 forms a carrier configured to carry a plurality of information processing cartridges 43 located side by side along the shelf.

The term "shelf" is used herein in a conventional way to describe a structure that is mountable in rack system 31 and is configured to carry one or more components to form at least a part of a rack-mountable system. In the present example, the shelf 41 is three-dimensional, having a height (H), width (W) and depth (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

Each of the information processing cartridges contains at least one processor. Each information processing cartridge in the present example is operable as a server. In the described examples, the information processing cartridges are configured as robust enclosed modules.

In the present example, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

In the present example, the shelf 41 comprises a three-dimensional, generally rectangular, enclosure, or housing, 47 that is suitable for mounting in generic racking systems including both 4-post and 2-post systems. It can be mounted on fixed rigid rack mounting ears and/or a simple slide/support system. The present example is designed for standard 19"-wide racking (1"=25.4 mm) as defined, for example, in the well-known IEC297 and EIA 310 specification standards with height corresponding to the so-called 3U (3 standard unit) height. For mounting such a 3U unit in such a 19"-wide racking system, with a depth of, say 25" or 30", the enclosure can be arranged with a height of up to about 130.5 mm, a width of up to about 445 mm and a depth, including all hardware and fascias, but excluding cable management, of up to about 635 mm, with the depth from the front-most point of a fascia to a rear I/O connector panel of a rear mounted Field Replaceable Unit (FRU) of about 610 mm. Of course, other examples designed for other racking systems could have different dimensions.

This example of a shelf 41 has a single enclosure, or housing, 47 that houses a number of modular units or subsystems, the majority of which are replaceable in the field and are therefore known as Field Replaceable Units (FRUs). These modular units include the information processing cartridges 43.

The shelf enclosure 47 can be fabricated from sheet material (e.g., from steel sheet) to form a chassis portion 49 that includes a base 51, two sides 53 and 55, a front 57 and a rear 59. The word "front" as used here is merely used as a label herein to refer to the face, or wall 57 of the enclosure that is located at the main access side of the rack system 31 in use when the shelf is mounted therein. Similarly, the words "rear" and "side" are merely used as labels herein to refer to the faces, or walls 59, 53 and 55 that, in use, are located at those respective positions when the shelf is mounted in the rack system 31.

The openings 45 can be formed in the front face 57 for receiving the information processing cartridges 43 and, as will be explained later, apertures can also be formed in the rear face 59 for receiving further FRUs. The enclosure can further include a removable top cover 61 that can be secured to the chassis portion 49 by suitable fastening (e.g., screws). The apertures in the front and rear faces 57 and 59 allow at least some of the FRUs to be inserted into and/or removed from the shelf enclosure 47 via the front or the rear thereof, as appropriate, without removing the shelf from the racking. Access to components mounted in the shelf that are not accessible via one of the apertures in the front 47 and rear 59 faces can be achieved by removing the shelf enclosure 47 from the racking system 31 and then removing the top cover 61 of the shelf enclosure 47.

Figure 3:
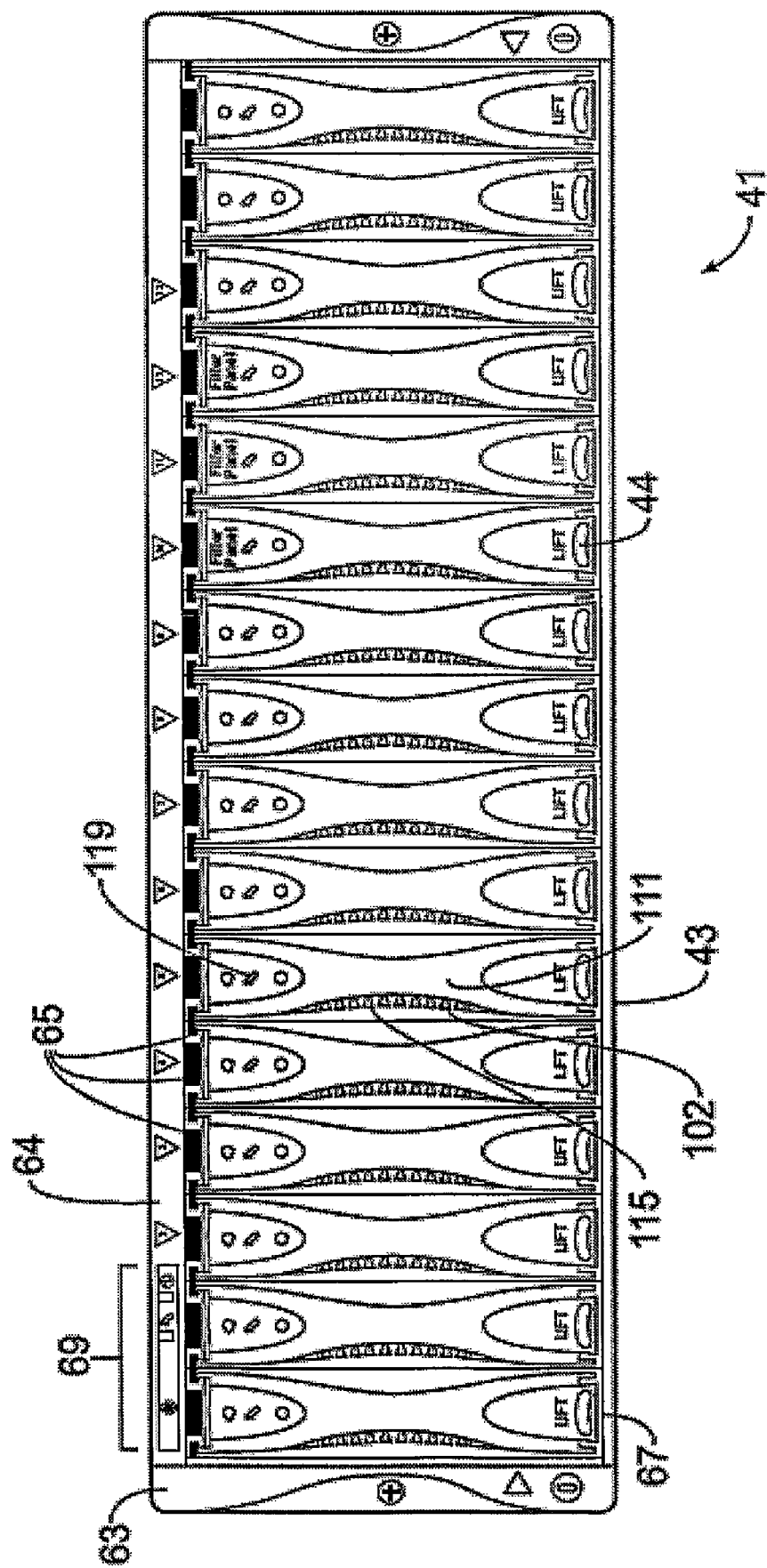
FIG. 3 is a front view of an example of a carrier in the form of a shelf of FIG. 2.

FIG. 3 is a front view of an example of a shelf 41 for a first example. A plastic front bezel 63 can be provided that fits on the front face 57 (shown in FIG. 2) of the chassis 49 of the shelf enclosure 47. The front bezel 63 can be formed as a unitary removable part that spans the whole width and height of the front of the shelf enclosure 47. The front bezel 63 could alternatively include a number of separate components, or moldings. The front bezel can include a peripheral portion 64 that can provide areas for corporate and product branding marks, for identification and numbering for the information processing cartridge and for a bar code label (all not shown). One or more apertures 65 can be formed in the peripheral portion 64 of the bezel 63. The apertures 65 in the bezel can be arranged to align with one or more apertures (e.g., a slot (not shown in FIG. 3) in the front face of the chassis. In use, air can pass through the apertures 65 to flow into the shelf enclosure 47 to reach FRUs that are mounted in the shelf enclosure 47 through the rear face 59 thereof. Air flowing through the aperture 65 flows into a plenum chamber 66 (not shown in FIG. 3) to flow past the processing cartridges 43 to reach rear mounted FRUs. A central area 67 of the front bezel 63 can be open allowing access to the openings 45 in the front face 57 of the shelf enclosure 47 for insertion and removal of the information processing cartridges 43. Where no active module is mounted in a location for an information processing module, a blanking panel, or filler panel, such as the blanking panel 44, can be located in that location. LED indicators 69 can be mounted on a system indicator printed circuit board (not shown) behind a designated area of the bezel to provide an indication of system status via light guides incorporated into the bezel. A further system indicator board (also not shown) carrying LED indicators can be provided inside the shelf enclosure to be visible from the rear thereof.

As mentioned above, in the present example of a shelf, up to sixteen information processing cartridges 43 can be installed in respective openings 45 in the front face 57 thereof. The number of information processing cartridges 43 actually installed in any installation is dependent upon the system configuration required. Various features relating to the information processing cartridges 43 that are shown in FIG. 3 will be described later.

Figure 4:
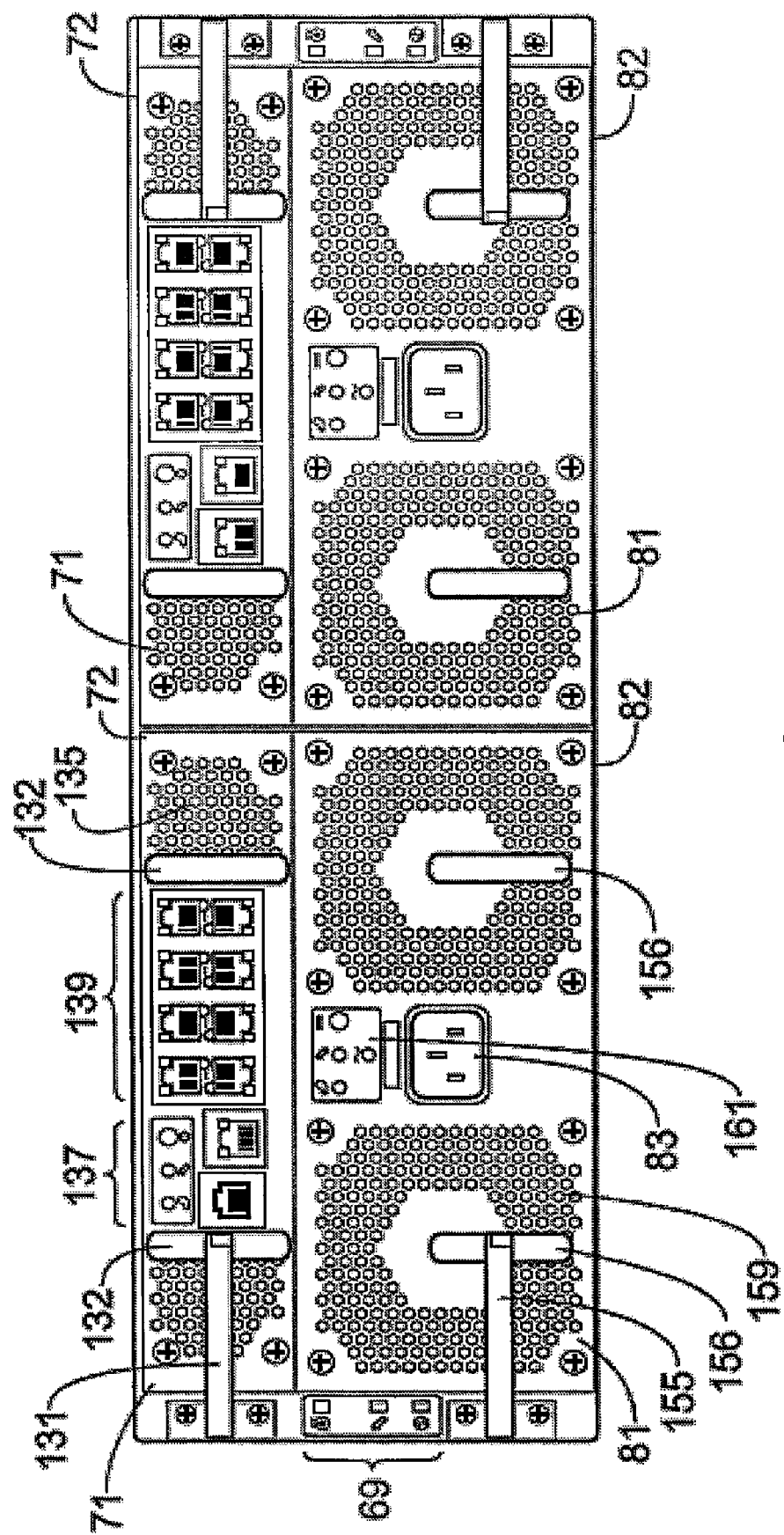
FIG. 4 is a rear view of an example of the shelf of FIG. 2.

FIG. 4 illustrates the rear of the shelf unit of FIGS. 2 and 3. This shows two different types of FRU 71 and 81 (4 units in total) that have been inserted into respective apertures 72 and 82 in the rear of the shelf enclosure 47. The FRUs shown in FIG. 4 include two Combined Switch and Service Processors (CSSPs) 71 and two Power Supply Units (PSUs) 81.

A midplane 171 (not shown) is provided in the shelf enclosure 47 to interconnect the information processing cartridges to the FRUs mounted in the rear of the shelf enclosure 47.

Figure 5:
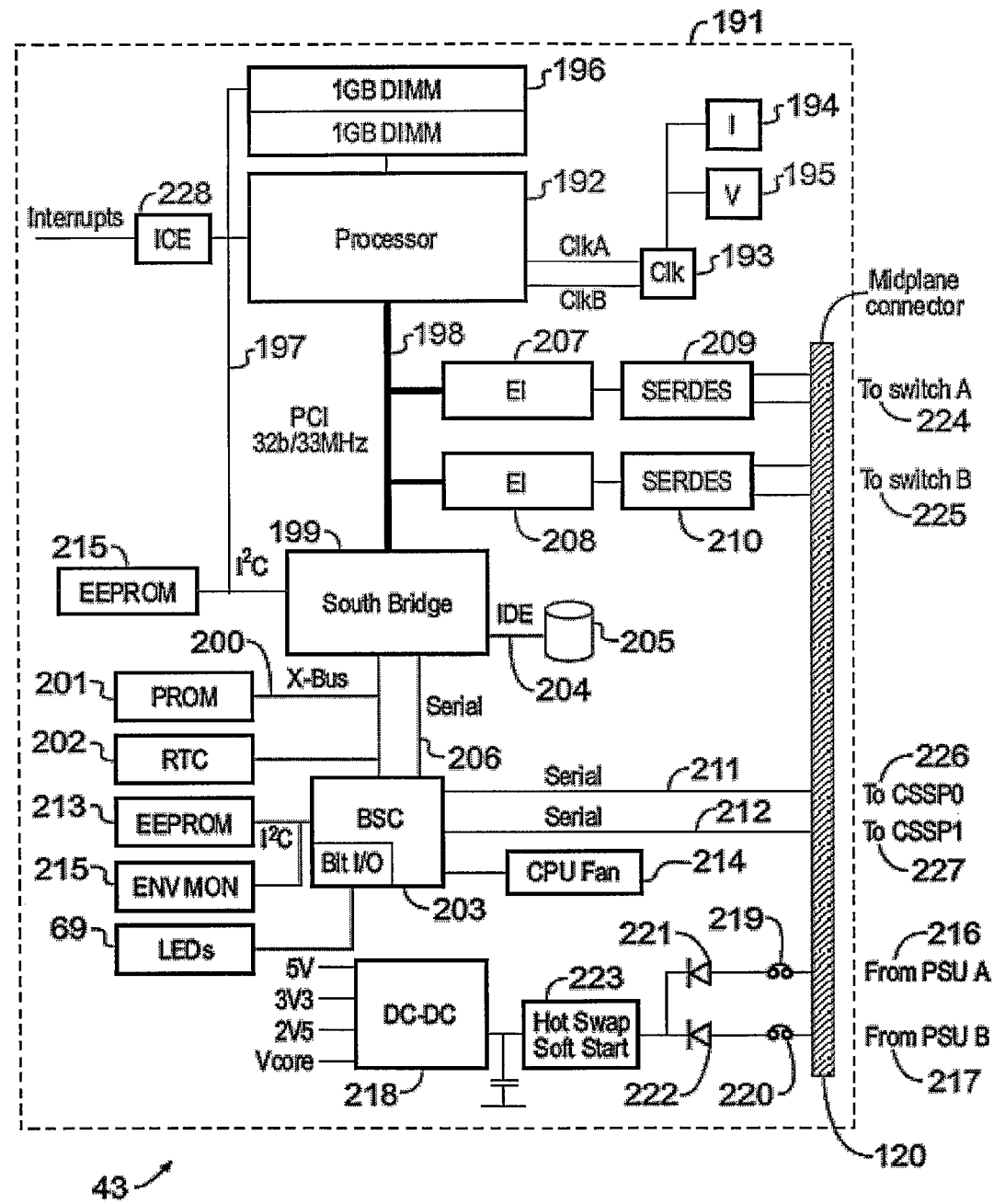
FIG. 5 is a functional block diagram of an example of an information processing subsystem for the information processing cartridge of FIG. 5.

With reference to FIG. 5, there now follows a description of functional elements of an information processing cartridge 43 as contained within the information processing cartridge enclosure 101.

The information processing cartridge 43 includes a microprocessor 192 (a non-limiting example of a microprocessor that can be utilized in the present example is an UltraSPARC™ processor). The microprocessor is mounted on an information processing cartridge motherboard 191.

A configurable clock generator 193, configured as a programmable clock synthesizer employing a crystal, can be used to produce CPU clock signals, CLKA and CLKB. The clock frequency can be determined by jumper settings (not shown). A vectored interrupt controller (I-Chip) 194 and a configurable core voltage regulator module (VRM) 195 are provided.

In the present example, memory means for use by the processor 192 when executing instructions can be provided in the form of buffered dynamic random access memory (DRAM), for example configured as dual in line memory modules (DIMMs) 196 with a 72-bit data path with error correction codes (ECC), seated in two sockets on a riser card from the information processing cartridge motherboard 191. The memory capacity can be chosen to suit the processor addressable memory space. For example, in the present example, up to 4 Gigabytes (4 GB) of addressable memory can be provided. Serial Presence Detect (SPD) auto-configuration is provided via a Service Management Bus (SMBus) over an I2C bus 197.

In the present example, a PCI bus architecture can be employed with a so-called SouthBridge bus bridge 199 with SuperIO and two Gb Ethernet Media Access Control (MAC) devices. As described above, however, other bus protocols (e.g., Infiniband) can be used. A 32 bit PCI bus 198 can be provided from the microprocessor 192. The SouthBridge 199 is a standard form of bus bridge, in the present example packaged in a 352 pin PBGA (Plastic Ball Grid Array) package, that provides the following functions: an SM Bus interface over the I2C bus 197 for access to the SPD (Serial Presence Detect) feature of the DIMMs that allows initialization of the memory controller; an Xbus interface for access via an Xbus 200 (which is a packet switched multiprocessor bus) to a PROM 201, a real time clock (RTC) 202 and an information processing cartridge service controller (hereinafter termed a Blade Service Controller (BSC)) 203; an IDE (Integrated Drive Electronics) interface that provides an ATA-100 (AT Attachment) IDE connection 204 to an IDE disk drive 205; and a serial console interface on a service bus 206 to the BSC 203 that is used for operating system functions including a console function with this embodiment.

For IO to the midplane 171, two AC-coupled Ethernet interfaces 207 and 208 are provided in the present example, which are packaged in a 316 pin PBGA. These Ethernet interfaces can provide a PCI attached Ethernet MAC capable of operation up to Gigabit Ethernet performance. The physical layer can be implemented using SERializer/DESerializers (SERDESs) 209 and 210. An example of a SERDES device is the TLK2201 transceiver manufactured by Texas Instruments, Inc. The SERDES devices use differential PECL TX+/− and RX+/− (Positive Emitter Coupled Logic Transmit and Receive) pairs to communicate to the switch portions of the CSSPs 71 over the midplane 171. The RX+/− pairs can be AC coupled at the information processing cartridge 43, the TX+/− pairs can be AC coupled at each CSSP 71. This facilitates hot-swap of the information processing cartridges 43 and the CSSPs 71.

Asynchronous serial connections 211 and 212 for communication between the BSC 203 and the Service Processor parts of the CSSPs 71 can be provided.

Internal data storage can be provided in the present example by a hard disk 205 with a capacity of 30 GB or more rated for 24/7 continuous operation. The hard disk 205 is accessed using the primary IDE interface of the SouthBridge 199. The hard disk 205 can hold an operating system, for example a Solaris™ operating system, and other software and data for performing information processing using the main, or host, processor (CPU) within the information processing cartridge 43.

In the present implementation, the BSC 203 can be implemented as a microcontroller (e.g., a Hitachi H8 microcontroller). The BSC 203 can provide various functions, including for example: dual access (for the information processing cartridges and the CSSPs 71) to PROM 201 and EEPROM 213 for boot information and a FRU-ID for the information processing cartridge; channeling communication between an information processing cartridge 43 and the service processor part of the CSSPs 71; control of power on reset (POR), system reset and externally initiated reset (XIR) to the microprocessor 192; control of the power, service-required and ready-to-remove LEDs 69; upgrading of field-upgradable firmware, via the serial interface; a watchdog function for the operating system; monitoring the speed of a CPU fan 214; and communications with an EEPROM 215 and the operating system via the Xbus 200.

In the present example, the BSC 203 can be powered by a 5V service bus (SB) rail as soon as a CSSP 71 and a PSU 81 are fully inserted into the midplane 171, it then turns on other DC/DC converters to provide power to the remainder of the information processing cartridge 43. A BSC reset signal can be derived from a simple conventional power on reset (POR) generator that monitors a 5V supply rail.

In the present example a 1 MByte Flash PROM 201 can be provided for storing boot variables for OpenBoot™ PROM (OBP) and Power-On-Self-Test (POST). Further OBP variables can be stored in a second 16 kByte (16 kB) I2C PROM 215, accessible via the SouthBridge SM Bus port over the IC Bus 197. The PROM 215 can contain 8 kByte for OBP variables and 8 kByte of unused space. A 16 kByte I2C EEPROM 213 that is accessible via the BSC 203 can contain BSC variables and FRU-ID variables. The EEPROM is nominally divided into 8 kByte for FRU-ID and 8 kByte for the BSC variables. Write protection for the FRU-ID is implemented by BSC firmware. Such write protection may be carried out by, for example, acknowledging instructions to write to the protected area, but not to carry out those write instructions.

An environmental monitor sensor 215 can be provided to monitor the CPU and ambient temperatures. This sensor can be accessible via the onboard I2C bus from the BSC 203.

The information processing cartridge 43 can be powered from two, diode commoned, 9V power supply rails 216 and 217. DC/DC converters 218 can be used to provide the voltage levels required by the information processing cartridge 43. The DC/DC converters 218 are supplied by dual 9V inputs 216, 217, individually fused 219, 220 and then diode commoned 221, 222. A 5V DC/DC converter can be turned on as soon as the FRU is fully inserted, with the BSC 203 and required portions of the SouthBridge 199 being powered (the 5 VSB rail). A field effect transistor (FET) can be used to gate off the main 5V supply to the rest of the information processing cartridge 43. The DC/DC converter outputs and the main 5V FET can be arranged not to turn on until the BSC 203 turns them on via a signal from the SouthBridge 199. The SouthBridge 199 can be used so that if the BSC 203 is reset (by a watchdog timeout or after a firmware download) the state of the DC/DC converters 218 is not affected. When the remaining outputs from the DC/DC converters 218 are within specification, a PWR_GOOD signal can be asserted low to the BSC 203.

A SouthBridge resume circuit can be operable to run from 3V3, and a simple Zener diode dropper circuit can be used to generate 3V3 from the 5 VSB supply.

When the FRU is inserted the inrush current can be limited, for example to <1 A, and the rate of rise can be configured not to exceed a predetermined value (e.g., 20 A/s) to provide a so-called soft start to facilitate hot-insertion. The intent is to prevent damage to the connectors and to avoid generating noise. A soft start controller 223, which controls a ramping-up of voltage levels, can be enabled when the predetermined signal (Inserted_L signal) is asserted low, this signal is on a short pin in the connector and is connected to ground (GND—not shown) through the midplane 171.

In the present example, a processor impingement fan (processor fan) 214 is configured to run at full speed to cool the information processing cartridge 43 and the fan. The speed of the processor fan and sink can be monitored by the BSC 203, using a tachometer sense pin on the microcontroller. In the event of the fan speed falling below a predetermined speed, or percentage of its nominal speed (e.g., 80%), the BSC 203 can be arranged to issue an alert. The nominal speed of the fan can be recorded as part of the BSC EEPROM contents.

The midplane connector 120 for the information processing cartridge 43 is used to establish the connection between the information processing cartridge 43 and the midplane. In the present example it supports up to 84 connections (pins) that will deliver SERDES outputs 224, 225, I2C signals 226, 227, and power 216, 217. Signal connections may be made through a right-angled connector. Power connections may be made through the information processing cartridge right-angled connector. The connector can be configured to facilitate hotswapping of the information processing cartridge, for example by having a low insertion force and/or guide pins to increase the ease of serviceability and prevent module misalignment during insertion.

Interrupts to the processor 192 can be encoded using an encoded interrupt vector mechanism. An I-Chip Emulator (ICE) 228 functions as an interrupt concentrator, receiving all system interrupts and encoding them as an interrupt vector according to an interrupt vector code utilizable by the processor 192. In the present example, where an UltraSPARC™ processor is used, the interrupt vector encoding may be based on a 6-bit interrupt vector code.

Figures 6, 6A:
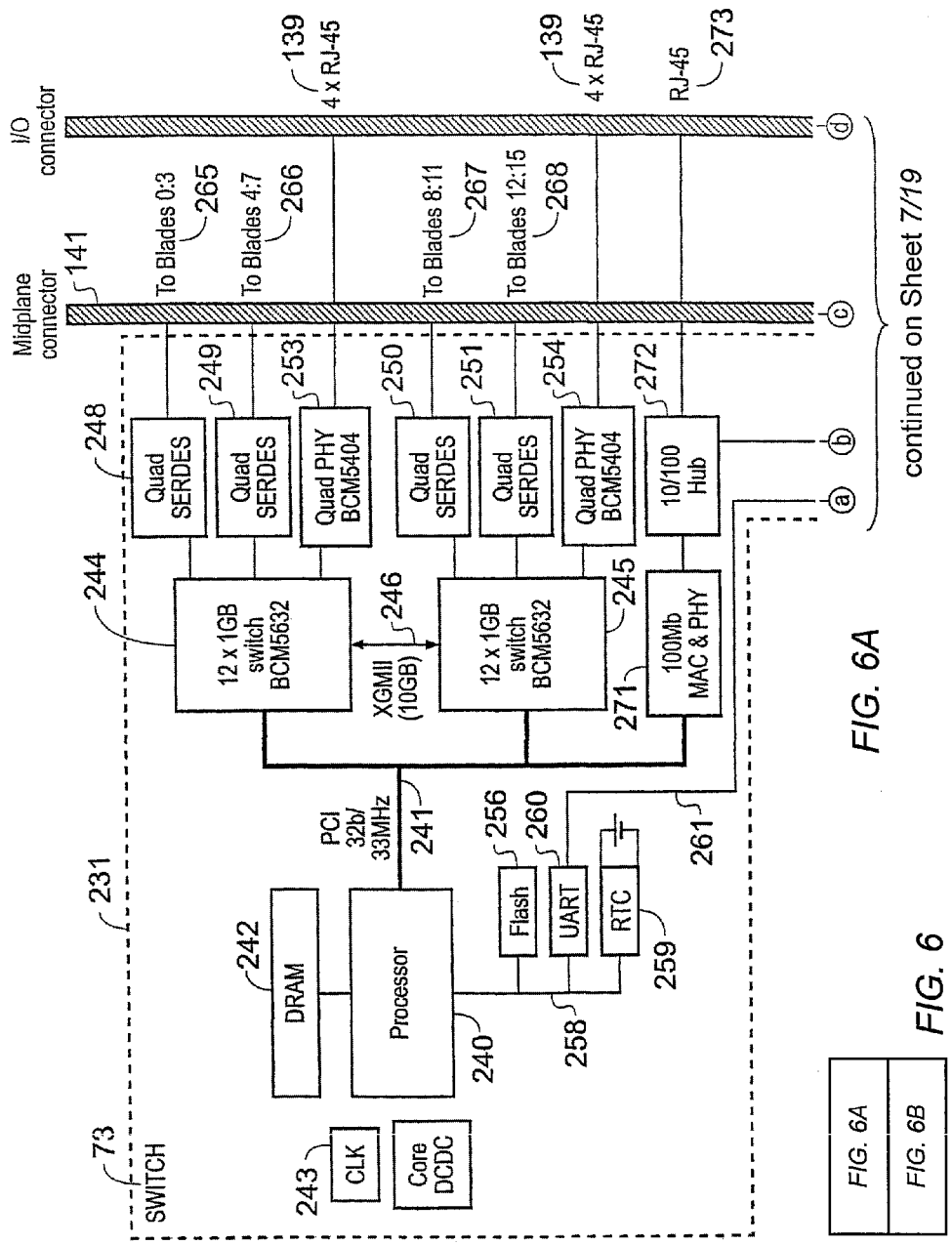
FIG. 6, formed from a combination of FIGS. 6A and 6B, is a functional block diagram of an example of an information processing subsystem for the combined switch and service processor module of FIG. 6.
Figure 6B:
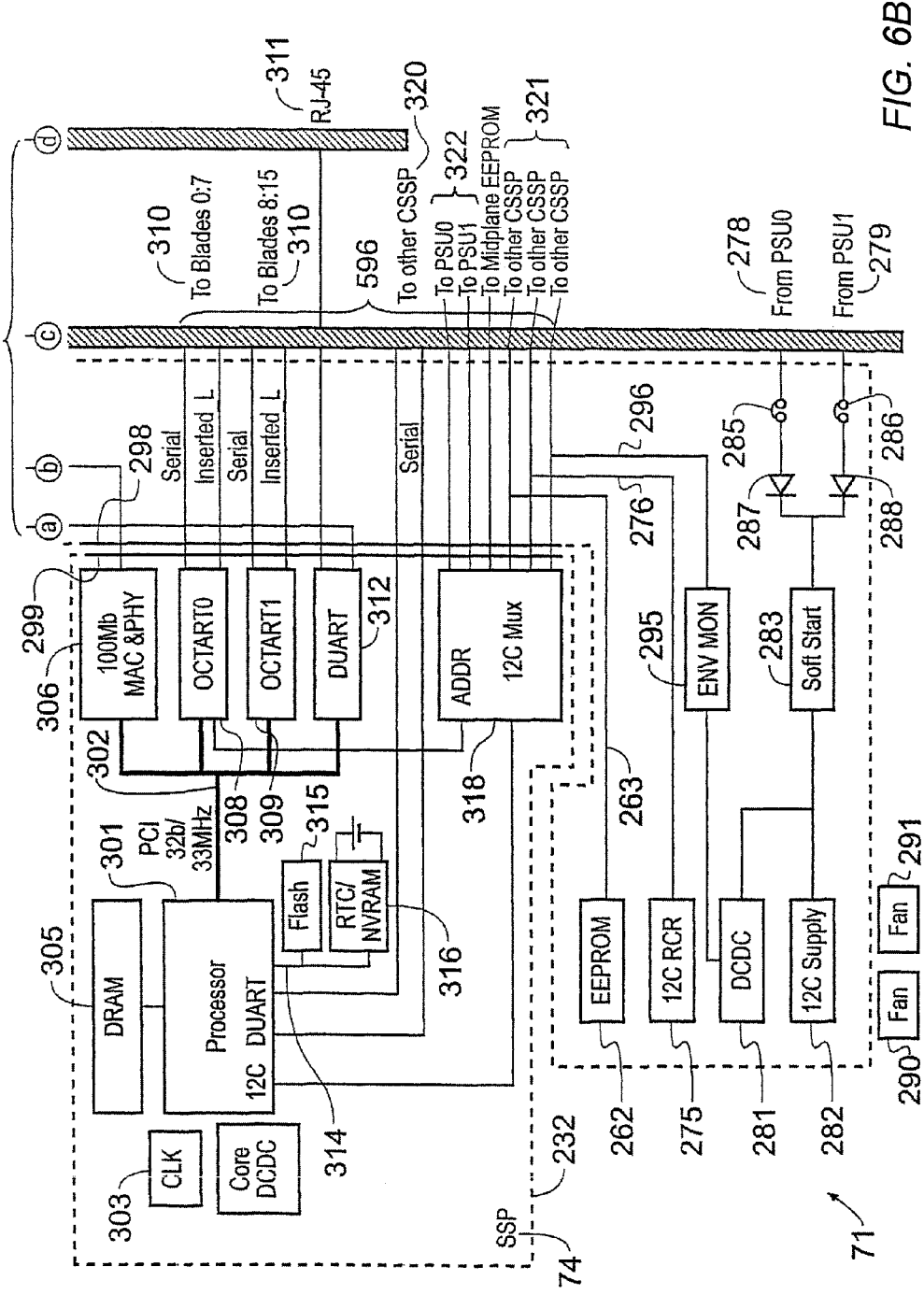

With reference to FIG. 6, which is formed by a combination of FIGS. 6A and 6B, there now follows a description of an example of a combined switch and service processor (CSSP) 71. In the present example, each CSSP 71 provides the functionality of a Switch 73 and of a Shelf Service Processor, or Shelf Service Processor (SSP) 74.

FIG. 6 provides an overview of the functional components of the CSSP 71 including functional components of the Switch 73 and functional components of the SSP 74. In the present example, most of the components relating to the Switch 73 are mounted on a Switch PCB 231, and the components relating to the SSP 75 are provided on a SSP PCB 232. However, it should be noted that the components located in the lower portion of the switch PCB 321 (i.e., that portion below the SSP PCB 232 as illustrated in FIG. 6 logically belong to the SSP 74, rather than to the switch 73. It will be appreciated that such component arrangements are not compulsory for successful operation and that any other component arrangement over any number of component boards can be easily achieved using conventional component arrangement techniques.

Firstly, with reference to FIG. 6, there follows a description of functional elements of the Switch portions 73 of a CSSP 71 as contained within the CSSP enclosure 121.

The midplane connector 141 on the CSSP 71 establishes the connection between the CSSP 71 and the midplane 171. In the present example, it supports up to 84 connections (pins) that will deliver SERDES outputs 265-268, I2C signals 310, 320, 321 and 322, and power 278, 279. Signal connections may be made through two 20-pair right-angled connectors. Power connections may be made through a right-angled connector. The connector can be configured to facilitate hotswapping of the board, for example with a low insertion force. The connector also uses guide pins to increase the ease of serviceability and prevent module misalignment during insertion.

A switch microprocessor 240 is provided, in the present example the microprocessor used is a Power PC (MPC8245) packaged in a 352pin Tape Ball Grid Array (TBGA) package. This microprocessor 240 supports between 1 MB and 2 GB of address space in the present example. It further includes an Embedded Programmable Interrupt Controller (EPIC) that provides 5 hardware interrupts (IRQs) or 16 serial interrupts. There are 4 programmable timers with cascade mode function. DRAM memory for the processor can provided in the present example by a commodity DIMM 242. The processor 240 can be connected to a 32 bit PCI bus 241, which operates at, for example, 33 MHz/66 MHz.

A clock input to the processor 240 can be provided by a clock generator (CLK) 243. The CLK 243 can include a configurable clock generator (not shown) implemented as a programmable clock synthesizer employing a crystal used to produce CPU clock signals. The clock frequency can be determined by jumper settings (not shown). A vectored interrupt controller (I-Chip) (not shown) and a configurable core voltage regulator module (VRM) (not shown) can be provided that operate substantially as described above with reference to the like components of FIG. 5.

In the present embodiment two switch ASICs (application specific integrated circuits) 244, 245 are provided (in the present example, BCM5632 Gigabit switch ASICs). Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialized Gb Ethernet data, are provided through four quad SERDES 248-251 to allow each information processing cartridge 43 to communicate with the switch 73. Eight GMII 1 Gb 'uplinks' are provided for external communication through two quad PHYs 253 and 254 (in the present example BCM5404 ASICs) and RJ45 connectors on the rear panel 122. The ASICs 244 and 245 are configured via a PCI interface (32 bit/33 MHz) to the PCI bus 241.

A Flash PROM 256 can store a real time operating system, and management and configuration data for the microprocessor. The Flash PROM 256 in the present example can be operable to hold 8 MB-16 MB of data, depending on the software required. The flash PROM 256 can be operated via an on-chip XBus 258.

Also connected to communicate with the processor 240 via the XBus 258, a Real Time Clock (RTC) 259 can be provided for real-time functions with a back-up battery.

Also connected to the XBus 258 can be a UART (Universal Asynchronous Receiver Transmitter) 260 which in turn connects to a serial bus 261 for providing an asynchronous console connection from the switch 73 to the SSP 74 which can be accessed by the SSP.

An integrated MAC/PHY (Media Access Control/Physical) switch 271 can provides its own interface to the PCI bus 241. This MAC/PHY switch 271 can connects to a 10/100 Ethernet hub 272. The hub 272 can be operable to provide a management interface to the SSP 74 and a connection from an external management network to the switch 73 and SSP 74 of a given CSSP 71. The connection from the integrated MAC/PHY device 271 to the SSP 74 can be coupled capacitively. A loopback mode can be provided by the MAC/PHY device 271 for system diagnostics. The hub 272 can connect to an RJ45 connector 273 on the rear panel 122 of the CSSP enclosure 121.

An 8 kByte I2C EEPROM 262 can be used to store the FRU-ID and is accessible by the SSP portion 74 of each CSSP 71 via a serial bus 263 and the midplane 171. The upper 2 kByte of the EEPROM 262 can be configured to be write protected.

An I2C Redundant Control Register (RCR) 275 can be used to provide an alternate, redundant path for poweringdown the CSSP 71 and Shelf Level Indicators 69 mounted on the front 57 and rear 59 panels of the shelf 41. The I2C RCR 275 can be accessible by both the SSP 74 of the CSSP 71 containing the RCR and the SSP 74 of a further CSSP 71 connected via the midplane 171 via an I2C bus 276. In the present example, a device suitable for use as the RCR 275 is a Phillips PCF8574 IC.

With continued reference to FIG. 6, there now follows a description of functional elements of the Shelf Service Processor (SSP) portion 74 of a CSSP 71 as contained within the CSSP enclosure 121 and provided on an SSP PCB 232.

In the present example, communication between the Switch PCB 231 and the SSP PCB 232 is facilitated by an interboard connector pair 298 and 299. It supports connections (pins) for I2C signals, 10/100 MAC/PHY output, and power. As described above, the switch PCB 231 carries the components associated with the switch, and it also carries the power, FRU-ID and environmental monitoring components along with the connectors for connections to the midplane 171 and external connectors. Thus, in the present example, all SSP components requiring a connection to the midplane 171 or an external connection have signal paths routed through the connector pair 298, 299 and via the switch PCB 231 to the relevant midplane or external connectors.

In the present example, the SSP 74 includes a microprocessor 301 (e.g., a Power PC (MPC8245) processor) mounted on the SSP printed circuit board (PCB) 232. The processor 301 can be connected to a PCI bus 302, the present instance a 32 bit bus that operates, for example, at 33 MHz/66 MHz.

A clock input to the processor 301 can be provided by a clock generator (CLK) 303. The CLK 303 can comprise a configurable clock generator (not shown) implemented as a programmable clock synthesizer employing a crystal used to produce CPU clock signals. The clock frequency can be determined by jumper settings (not shown). A vectored interrupt controller (I-Chip) (not shown) and a configurable core voltage regulator module (VRM) (not shown) can be provided that operate substantially as described above with reference to the like components of FIG. 5.

The processor 301 can be provided with a DRAM memory 305. The memory capacity can be chosen to suit the processor addressable memory space. In the present example, 8 MB of DRAM memory is provided.

An integrated MAC/PHY switch 306 can provide its own interface to the PCI bus 302. The MAC/PHY switch 271 can be connected to 10/100 Ethernet hub 272 via the interboard connectors 298, 299. A loopback mode can be provided by the MAC/PHY switch 306 for system diagnostics.

Octal UARTs 308 and 309 can be connected between the PCI bus 302 and the interboard connector pair 298, 299. The signal path can be continued from the interboard connector pair 298, 299 to serial connections 310 on the midplane connector 141 on switch PCB 231. The Octal UARTS 308, 309 can facilitate serial communications between the SSP 74 and each of the processing cartridges 43.

Also connected to the PCI Bus 302 can be a dual UART (DUART) 312 that in turn can connect via the interboard connectors 298, 299 to serial bus 261 for providing an asynchronous console connection from the SSP 74 to the switch 73. The DUART 312 can also have an I2C connection to an external connector on the rear face 122 of the CSSP enclosure 121. The external connector can provide a common operating system/boot console and command port 311.

Connected to the processor 301 via an XBus 314 can be a Flash PROM 315. The Flash PROM 315 can store a real time operating system, and management and configuration data for the microprocessor 301. The Flash PROM 315 can be operable in the present example to hold up to 2 MB of data, depending on the software required.

Also connected to the processor 301 via the XBus 214 can be a real time clock (RTC) 316 for real-time functions with a backup battery. The RTC 316 can also provide 8 kByte of non-volatile random access memory (NVRAM), in the present instance implemented as an EEPROM. This can be used to contain information such as the FRU-ID, a serial number and other FRU information.

To facilitate I2C communications between the SSP 74 and the other CSSP 71, the midplane 171 and the PSUs 81, a multiplexer 318 can be provided. The multiplexer 318 can have a single I2C connection to the processor 301 and connections, via the interboard connector pair 298, 299 and the midplane connector 141 to both PSUs 81, the midplane 171 and the other CSSP 71.

The processor 301 can also comprise an embedded DUART to provide a redundant serial link to the SSP 74 of the other CSSP 71. Although it would be possible to implement this link using an external DUART, the advantage of using an embedded DUART is that the connection to the other CSSP is reliable and therefore likely to be functional. Where the embedded DUART link does not use the I2C Multiplexer for communications to the other CSSP, a common mode of failure for both the SSP-SSP I2C links can be avoided, it being assumed that the processor 301 is likely to be functional even if both embedded DUART channels are non-functional.

The CSSP 71 can powered from two, diode commoned, 9V power supply rails 278 and 279. DC/DC converters 281 can be used to provide the voltage levels required by the CSSP 71. The DC/DC converters 281 can be supplied by dual 9V inputs 278, 279, individually fused 285, 286 and then diode commoned 287, 288. A soft start controller 283 can be provided to facilitate hot-insertion. A 5V DC/DC converter (I2C power regulator) 282 can be turned on as soon as the CSSP 71 is fully inserted. A 3.3V DC/DC converter can be turned on when instructed, for example through SSP service software, by asserting low an appropriate signal (ON_L—not shown). The 3.3V converter can be arranged to turn on a converted for 2.5V, 1.2V, and a processor core voltage rail (Vcore) when the voltages are within an appropriate range.

When the CSSP 71 is inserted the inrush current can be limited, for example to <1 A, and the rate of rise can be configured not to exceed a predetermined value (e.g., 20 A/s) to provide a so-called soft start to facilitate hot-insertion. The intent is to prevent damage to the connectors and to avoid generating noise. A soft start controller 283, which controls a ramping-up of voltage levels, can be enabled when the predetermined signal (Inserted_L signal) is asserted low, this signal is on a short pin in the connector and is connected to ground (GND—not shown) through the midplane 171 until one of the supplies is removed. These circuits can be configured to withstand an overvoltage at their inputs whilst the input they are feeding is not powered, without any leakage to the unpowered circuit. A sense circuit can detect if the voltage has dropped below a threshold, for example 2.0V, as a result of a blown fuse, a power rail going down, etc. The DC/DC converters 281 can be protected against short circuit of their outputs so that no damage occurs.

The I2C regulator 282 can be powered as soon as the CSSP 71 is fully inserted into the midplane 171. This can be facilitated through short pins connected to the soft start controller 283, which controls a ramping-up of voltage levels. The other DC/DC regulators can be turned on, for example by SSP software.

A pair of fans 290, 291 can provide cooling to the CSSP 71. The fans 290, 291 can be configured to run at full speed to prevent overtemperature conditions by minimizing the temperature of the internal components and the fan. The speed of the fans 290, 291 can be monitored by the SSP 74 through an environmental monitor 295 on the switch board 231. The environmental monitor 295 can be alerted in the event of the fan speed falling below a predetermined value (e.g., 80% of its nominal speed). The fan can provide tachometer outputs to facilitate the measurement of fan speed.

LED indicators 137 can be provided, for example with a green power LED, an amber LED for indicating that service is required and a blue LED for indicating that the switch is ready to be removed. LED indicators integrated on 2×4 stacked RJ45 connectors on the rear face of the CSSP 71 can be arranged, for example, to show green continually when the link is present and flash green when the link is active.

The environmental monitor ENV MON 295 can be provided to maintain operational integrity of the CSSP 71. The ENV MON 295 can include limit values in limit registers and can monitor, for example, temperature within the CSSP enclosure 121, the CSSP power rails, including the 12V, 3V3, Switch Processor Core Voltage, CSSP Processor Core Voltage and the two 9V power feed rails 278, 279 from the midplane 171. The outputs of the DC/DC converters 281 can be fed in to A/D inputs of the ENV MON 295 for Watchdog comparisons to be made to the voltage limits set in the limit registers. As noted above, the ENV MON 295 can also monitor the operating speeds of the fans 290 and 291. The ENV MON 295 can communicate with the SSP 74 of both CSSPs via an I2C bus 296.

For IO to the midplane 171 (not shown), the midplane connector 141 can include sixteen 1 Gb Ethernet connections 265-268 from four quad SERDES 248-251 and the I2C bus lines 596.

The SSP 74 can access the I2C devices (FRU-ID EEPROM, 8-bit I/O expansion chip, and the system hardware monitor) through the midplane 171.

For external IO, rear panel Gb Ethernet connections can be provided from the two quad PHYs 253, 254 to 2×4 stacked RJ45 connectors 139 (to give 8 uplinks). Each port can be an independent 10/100/1000 BASE-T (auto negotiating) port. The PHY devices 253, 254 can operate in GMII mode to receive signals from the 8-Gigabit interfaces on the ASICs 244, 245.

The Power Supply Units (PSUs) 81 can configured such that when two or more PSUs 81 are connected in parallel in the shelf 41, failure of any one of the paralleled units shall not affect system operation. Moreover, one of the PSUs can be installed or removed from a "live" system with or without input power applied. The outputs can have overcurrent protection.

The PSU can have an I2C interface to provide power supply status via the midplane 171. The PSU can have an internal temperature sensor that reports via the I2C interface. The PSU fan speed can also be monitored and errors are reported via the I2C interface. Overvoltage and overcurrent sensors can also report via the I2C interface.

Figure 7:
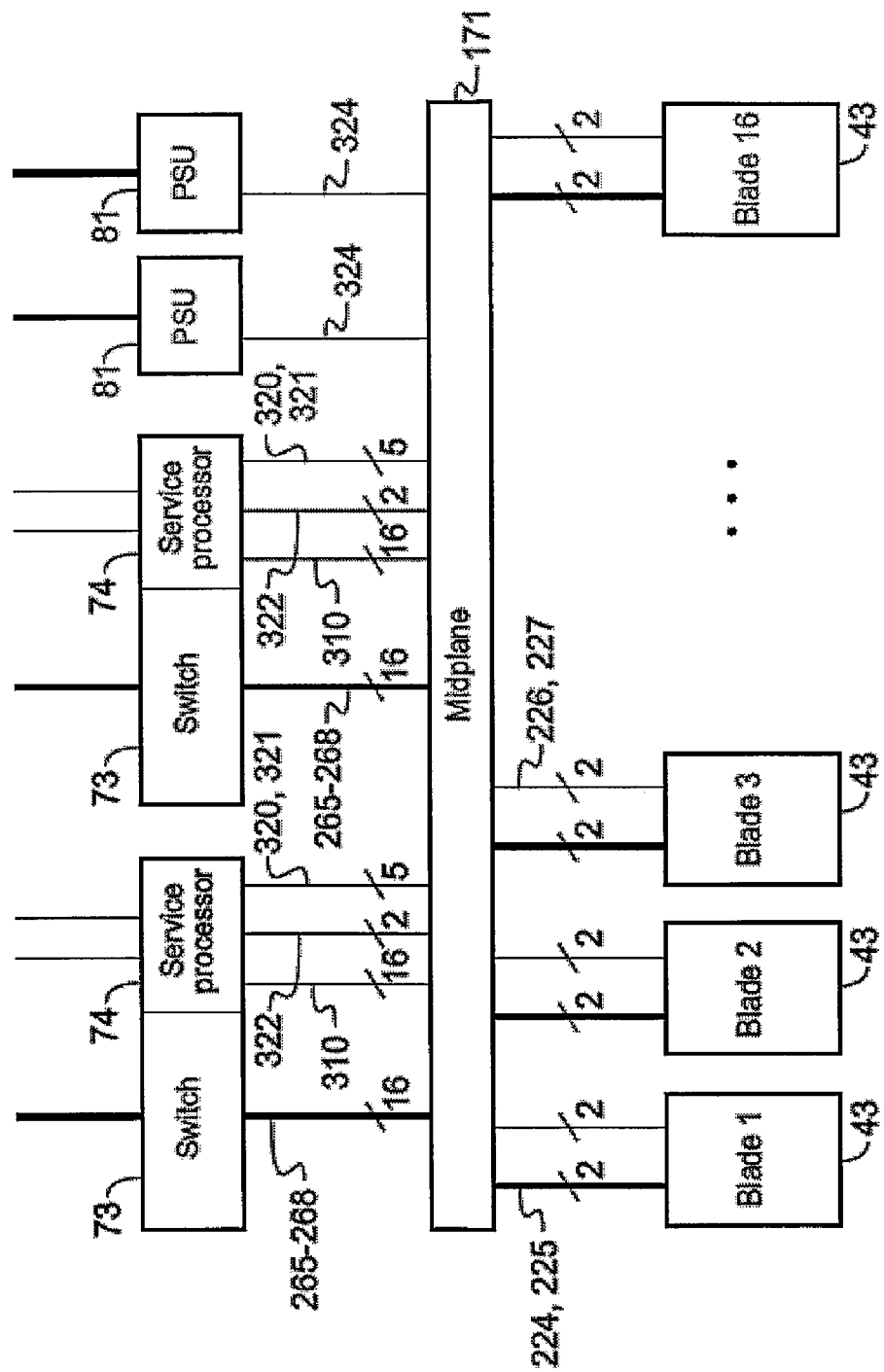
FIG. 7 is a functional block diagram showing the connectivity between the components of the shelf of FIG. 2.

With reference to FIG. 7, there will now be described an example of data connectivity between the FRUs and midplane of the shelf 41. Power transmission paths are not illustrated in FIG. 7. However, it will be appreciated that to facilitate the maximum component redundancy of the shelf 41, each PSU 81 can independently provide power to each FRU.

In the present example each of the processing cartridges (blades) 43 connects to the midplane 171 via a pair of information signal connections (e.g., Gb Ethernet links) 224, 225 and a pair of serial management signal connections 226, 227. Connections within the midplane 171 can ensure that each Ethernet link 224 is directed to a connection 265-268 from the midplane 171 to a first switch 73, and that each Ethernet link 225 is directed to a connection 265-268 from the midplane 171 to a second switch 73. Thus one Ethernet link can be established between each processing cartridge 43 and the switch 73 of each CSSP 71. Further connections within the midplane 171 can ensure that each serial connection 226 is directed to a connection 310 from the midplane 171 to the first SSP 74 and that each serial connection 227 is directed to the second SSP 74. Thus one serial link can be established between each processing cartridge 43 and the SSP 74 of each CSSP 71. As mentioned earlier, information signal connections other than Gb Ethernet connections (e.g., Infinband connections) could be employed in other examples.

A plurality of serial connections can connect each SSP 74 to the other. Serial lines 320, 321 can connect each SSP 74 to the midplane 171 and connections within the midplane can connect the two sets of lines together. To provide a control interface from the SSPs 74 to the PSUs 81, serial lines 322 can connect each SSP 74 to the midplane 171 and connections within the midplane 171 can connect to serial lines 324 from the midplane 171 to each PSU 81.

An example of data and control connectivity of the shelf 41 to and from computer systems external to the shelf 41 when the shelf 41 is arranged for use within a multiprocessor server system such as that described above with reference to FIG. 1 will be described with reference to FIG. 8.

As summarized above with reference to FIG. 7, in the present example each processing cartridge, or blade, 43 is connected to the switch 73 of each CSSP 71 by an information signal connection (e.g., a 1 Gb Ethernet link) formed by a combination of links 224, 225 from the processing cartridge 43 to the midplane 171, connections within the midplane 171 and links 265-268 from the midplane 171 to each switch 73.

Further, in this example a set of serial management signal connections comprising links 320, 321 and connections within the midplane 171 connect the SSP 74 of each CSSP 71 to the SSP 74 of the other CSSP 71.

To provide external data connectivity between the shelf 41 and an external core data network 330, in association with which all information processing performed by the processing cartridges 43 of the shelf 41 is undertaken, connections 331 can be formed between the core data network 330 and the eight 1 Gb Ethernet ports 139 provided on the rear panel 122 of the CSSP enclosure 121.

In the present example, the connections by means of which control and configuration of the shelf 41 are performed are entirely separate to the connections to the core data network 330. Therefore, a first external switch 335 can connect to a management (I2C) port 273 of the first CSSP 71 and a second external switch 336 can connect to a management (I2C) port 273 of the second CSSP 72. As described above with reference to FIG. 6, the management port 273 can provide a management network interface to both the switch 73 and SSP 74 of each CSSP 71. The external switches 335, 336 can each be connected to each of a pair of System Management Server (SMSs) 338, 339. The SMS is not essential to the operation of the shelf 41, but use thereof aids optimal operation of the shelf 41. In a typical multiprocessor server system a plurality of shelves 41 may be connected together via the core data network 330 under the control of a single management network utilizing one set of SMSs 338, 339. A set of SMSs 338, 339 may comprise a single SMS (as well as a plurality thereof). However use of at least two SMSs enables redundancy of components, therefore increasing overall system reliability.

A serial interface control 343 operable under telnet protocol control is also connected to the shelf 41 in the present example. This can provide a common operating system/boot console connection to the SSP 74 of both CSSPs 71 via the RJ45 connector 311 on the rear panel 122 of each CSSP enclosure 121.

It will be appreciated from the above that a flexible and scalable modular computer architecture has been described. In the described example up to 16 information processing cartridges, or blades 43, can be configured as sealed FRUs on a single shelf 41, the number of blades being chosen according to customer requirements. Each blade has its own processor and random access memory. If, for example, there is a maximum of 2 Gbytes of memory per information processing cartridge, and one processor per blade, 16 processors (16 P) with 5.33 processors per unit height (1U) and a total of 32 GB of memory per shelf can be provided.

In the present example, the shelf 41 incorporates redundant combined switch and shelf service processor modules (CSSPs) 71 and redundant power supply units (PSUs) 81 separate from the blades 43. As the power supplies are carried by the shelf, the information processing cartridges can be kept compact and inexpensive. Also, as a result, they can be powered by DC power only, via the midplane 171.

Also, as mentioned earlier, the FRUs (e.g., the information processing cartridges, or blades, 43, the CSSPs 71 and the PSUs 81) can all be configured as sealed units that do not contain any internal FRUs themselves and do not contain user serviceable items. The enclosures of the FRUs can be arranged to enclose all of the functional components of the FRU with only electrical connectors being externally accessible and with indicator LEDs being externally visible as well.

These factors can all contribute to keeping the cost of the FRUs low, as well as that of the overall system. The modular approach with the use of sealed modular field replaceable units for providing system functionality and with non-field replaceable units designed with a minimum possible number of active components enhances reliability. Moreover, easy and rapid maintenance is facilitated in the event of a failure of a FRU by simple replacement of that FRU, further reducing the cost of ownership.

Thus, it will be appreciated from the above description that the provision of a rack mountable shelf, that includes power supplies, a shelf service processor and switches in modular units, for carrying a number of processing cartridges, wherein the number of processing cartridges can be chosen according to customer requirements, provides a flexible and scalable computer configuration. The balancing of the load between the processors of the processing cartridges can be effected by software using conventional principles.

A configuration as described provides an easily scalable processor architecture, whereby the processing power provided by a complete system based on the information processing cartridge/information processing cartridge carrier architecture can be scalable from moderate to very high capacity through the simple addition of further information processing cartridges.

Figure 9:
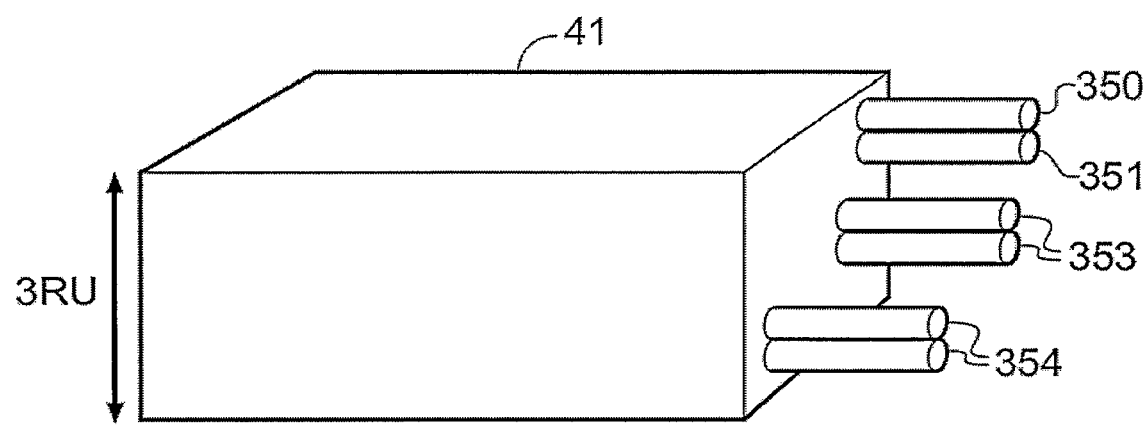
FIG. 9 is a schematic representation of a shelf showing the external connections from the shelf of FIG. 2.

As illustrated in FIG. 9, an example of the external connections from a shelf 41 can be in the form of two active information signal connections (e.g., Ethernet connections) 350 and 351, two active power connections 353 and an active/standby pair of management connections 354. With regard to the management connections, each connection comprises a serial connection and a network (e.g., Ethernet or Infiniband) connection. It is possible to connect to either the active or the standby connection, as the incoming signal will be internally routed to whichever management controller (CSSP) is the current master. It will be appreciated, therefore, that the connections to a shelf can be kept to a minimum. It will further be appreciated from the configuration shown in FIG. 9 that the system is scalable beyond a single shelf unit 41.

Figure 10:
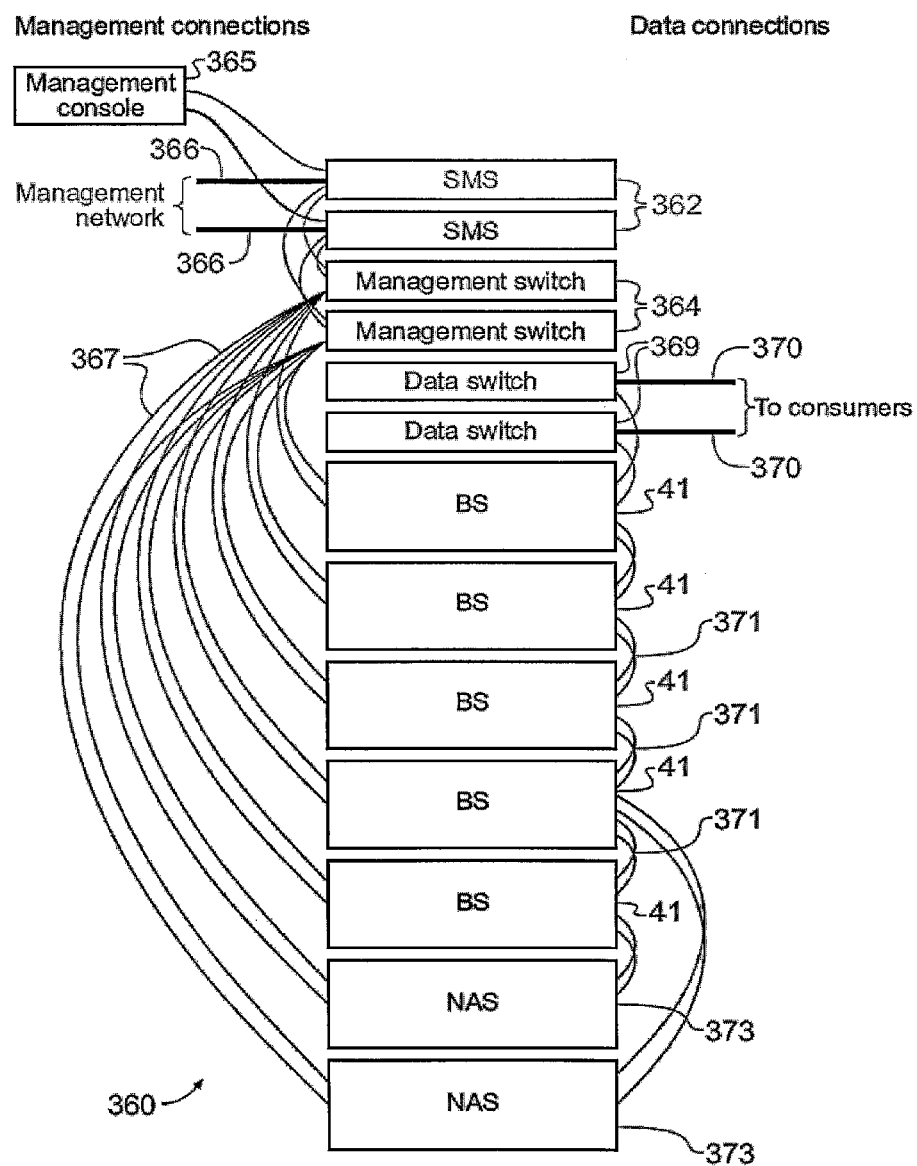
FIG. 10 is a schematic representation of a rack mounted system comprising a plurality of such shelves.

FIG. 10 illustrates how a plurality of shelves can be configured within one (or more) racks to provide even higher processing power. Such a constellation of shelves to provide a large grouping of servers is sometimes termed a "web farm" or "server farm" 360. As shown in FIG. 10, the web farm comprises a plurality of shelves 41 that each carry a plurality of blades 43. Also provided are a plurality of Network Attached Storage devices (NAS) 373 for providing storage for critical data, e.g., email data storage, for the web farm. The NASs 373 are not required if there is no critical data to be stored, e.g., if the web farm is operating solely to provide web caching services.

Management control of the web farm 360 can be provided through a pair of System Management Servers (SMSs) 362. Each SMS 362 can be connected to a management network via a link 366 and to a management console 365. The management console can be configured by programming a conventional personal computer or workstation, comprising a processor, memory, storage, user input/output devices, a display, network adapters, etc. The SMSs 362 can communicate with the individual shelves 41 via a pair of management switches 364. Each shelf 41 and NAS 373 can be connected to each management switch 364 via a connection 367. Thus dual redundant management connections can be provided to each shelf 41 and NAS 373.

Flow of data to and from the web farm 360 can be provided through a pair of data switches 369. Each data switch 369 can be connected to a consumer network via a link 370. It is to be understood that the consumer network can be a larger data network to which the web farm 360 is connected. This network can be an office or corporation intranet, a local area network (LAN), a wide area network (WAN), the Internet or any other network. Connections between the data switches and the shelves 41 can be facilitated by connections 371. It is to be noted that as each shelf has its own switching capability, there is no need for each shelf 41 to be directly connected to the data switches 369. Connections can also be provided to connect the NAS units 373 to the shelves 41. The topology used for interconnection of the data switches 369, shelves 41 and NASs 373 can be any topology providing at least one connection of any length between every possible pair of units. Complex topologies arranged to minimize the maximum connection length between any two given units in the web farm can be used.

The web farm 360 comprising a plurality of shelves 41 with or without a plurality of NASs 373 can suitably be used as any or all of the entry edge server group 9, web edge server group 15 and application servers 19 described above with reference to FIG. 1.

As an alternative to providing critical data storage within a NAS 373, such storage can be provided within one or more NAS cartridges fitted into one or more of the shelves 41 in place of processing cartridges 43. Another alternative is to provide a server shelf with local storage such as a RAID array (Redundant Array of Inexpensive Disks) in place of the NAS 373.

Thus there has now been described an example of a fully configurable computing system based on a plurality of self contained field replaceable units (FRUs) and scalable from a single processing cartridge with power supply and switching capability to a multiply redundant multiprocessor server system with full system management capability extending over a number of co-operably connected server shelves. It will of course be readily apparent to the skilled reader that many of the specific features specified in the above description are in no way limiting and a variety of alternatives may be produced using only ordinary skill and common general knowledge. Non-limiting examples of modifications which may be made to the above described system are discussed hereafter.

There is no limit placed on the processing cartridges as to what software they should run. Each module within a shelf or farm may run under the same operating system, or a plurality of different operating systems may be used. Examples of possible operating systems include Sun Microsystems' Solaris® OS or another UNIX™-Type OS such as Linux™, MINIX™, or Irix™, or UNIX™ or a Microsoft OS such as Windows NT™, Windows 2000™, Windows ME/98/95™, Windows XP™.

It is also not necessary that each processing cartridge within a shelf or farm be configured to run the same program software. For example, individual processing cartridges may be configured to execute, for example, fileserver software, mailserver software, webhosting software, database software, firewall software, or verification software.

Although in the described example, the functionality of a switch and of a shelf service processor is provided within a single combined switch and service processor unit, this is not essential and separate switch and shelf service processor field replaceable units may be used.

Although it has been described above that a pair of PSUs and a pair of CSSPs may be provided so as to enable dual-redundancy, further PSUs and CSSPs may be provided so as to increase FRU redundancy further, thus providing statistically higher reliability.

In the power supply circuitry in each of the blades and CSSPs, two voltage sense circuits may be provided after the fuses and before the diodes, to prevent a latent fault caused by a failed fuse going undetected until one of the PSUs is removed or taken offline. Such circuits may configured to withstand an overvoltage at their inputs whilst the input they are feeding is not powered, without any leakage to the unpowered circuit.

Although it has been described above with particular reference to FIG. 5 that the processing module may be based on an UltraSPARC™ processor, this is not limiting and any other processor having sufficient processing capacity to undertake the tasks required of a particular processing cartridge may be used. Alternative processors include, but are not limited to, Intel x86 series and compatible processors, AMD x86 compatible processors, Alpha processors and PowerPC processors.

Although it has been described above that each information processing cartridge comprises a single microprocessor, this is not a limiting case as each or any of the information processing cartridges may have more than one microprocessor arranged to share common storage resources to operate synchronously (in lockstep) or asynchronously. Also, it is not necessary that all information processing cartridges inserted into a shelf at a given time are identical, rather a variety of different blade architectures may be used simultaneously.

The provision of the functions of both Switch and Shelf Service Processor within a single FRU in the present example provides a facility within a single shelf 41 for dual redundancy in both functions in fewer different FRUs. As will be appreciated, there is no restriction that these two functions must be provided within a single FRU and division of the two functions into separate FRUs would present no difficulty to the skilled addressee.

One aspect of ensuring maximum possible computer availability relates to service and management of a computer system. In particular, service and management functions are in general required for monitoring system status and performing control actions in response to monitored parameters. There now follows an example of how service functions may be organized to be implemented in a hierarchical manner through different components of a modular computer system.

As described above with reference to FIG. 5, each information processing cartridge 43 has a blade service controller 203. The blade service controller 203 is a local controller of service functions for each information processing cartridge 43. Each blade service controller 203 is arranged to be able to communicate with the SSP 74 (see FIG. 6) of each CSSP 71 via the connections 226, 227 and 310. The SSP 74 provides shelf-level service functions for the population of each shelf 41, which includes the PSUs 81 and the switches 73 of the CSSPs 71 as well as the processing cartridges 43. Each SSP 74 is arranged to be operable to communicate with an external system management server (SMS) 338, 339 via I/O connector 273 as illustrated in FIG. 8. The system management server provides system level service functions for one or more shelves 41. The system management server may also provide service functions to computer system modules other than shelves 41 within a computer system, for example to individual server units and/or to reliable storage units such as Network Addressable Storage (NAS) units.

In the present example, the blade service controller 203 can provide the following service functions. It typically performs environmental monitoring of the information processing cartridge 43 within which it is situated, this includes monitoring of CPU and ambient temperatures by means of the environmental monitor 215, monitoring of the power supply rails from the DC to DC converter 218 and monitoring of the speed of the processor cooling fan 214. The blade service controller 203 may also perform a watchdog function for monitoring the operating system running on the processor of the processing cartridge 43. The blade service controller 203 can also provide an out-of-band interface between the processing cartridge 43 and the CSSP 71. The out-of-band interface is a physically discrete interface which is independent of the operating system and applications running on the processor, this interface may be used for providing processor cartridge parameters to the shelf SSPs 74 at boot. In addition, the blade service controller 203 may also provide local functions for control of the LED service indicators 119 and control of power on reset (POR) and externally initiated reset (XIR) to the processor. In the present example, there is no requirement for the blade service controller 203 to have any level of intelligence, it being sufficient that it is capable of performing simple watchdog and threshold type monitoring operations. However, the blade service controller 203 may be implemented having intelligence, which may be of particular benefit in the event that it is tasked with more complex functions than those set out above.

The SSP 74 (of which two are typically provided within a shelf 41 to provide redundancy) provides the following functions in the present example. It typically performs environmental monitoring for the shelf 41, monitoring the PSUs 81, the CSSPs 71 and the PSU inputs. The SSP 74 can also aggregate data from the blade service controller 203 of each blade 43 present in the shelf. The SSP 74 may also be configured to make decisions regarding aspects such as power control, control of the shelf service indicator LEDs 69 and to provide instructions to the blade service controllers 203. In the present example, the SSP 74 is not responsible for deployment of software to individual processing cartridges, however this function may be provided by the SSP 74 in alternative arrangements.

In order to provide a facility for manual monitoring and control of the SSP 74, it may be configured to have a user interface via which a user can be provided access to the functions and data of the SSP 74. The user interface access may be provided through one of the external serial interface connection 311 and the external network connection 273. The SSP 74 may be operable to operate as an isolated unit with no higher level service control provided. In general the SSP 74 requires little or no user intervention to manage the operation of a single shelf 41.

Fault management may be controlled by the SSP 74 such that a failed processing cartridge 43 (the failure of which may be detected, for example, from data provided by a blade service controller 203 indicating a failure of the processing cartridge's operating system or application or from errors detected in the switch 73) may be remotely restarted by the SSP 74, in the present example either by initiating an externally initiated reset (XIR) to the processor of the processing cartridge, or by causing an interruption in the power supply to the processing cartridge sufficient to cause a power on reset (POR) to the processor of the processing cartridge. In the present example, a failed processing cartridge will be the subject of a predetermined number of restart attempts before that processing cartridge is considered permanently failed, at which time the processing cartridge is removed from service in that it is ignored by the SSP 74 and the switch 73 is instructed not to pass traffic to it and to ignore any traffic from it and the failed nature is reported to any higher level service control to which the SSP 74 is connected.

In order to perform the above described functions, the SSP 74 of the present example is configured to have a degree of intelligence such that decision making steps and provision of a user interface are supported.

Figure 8:
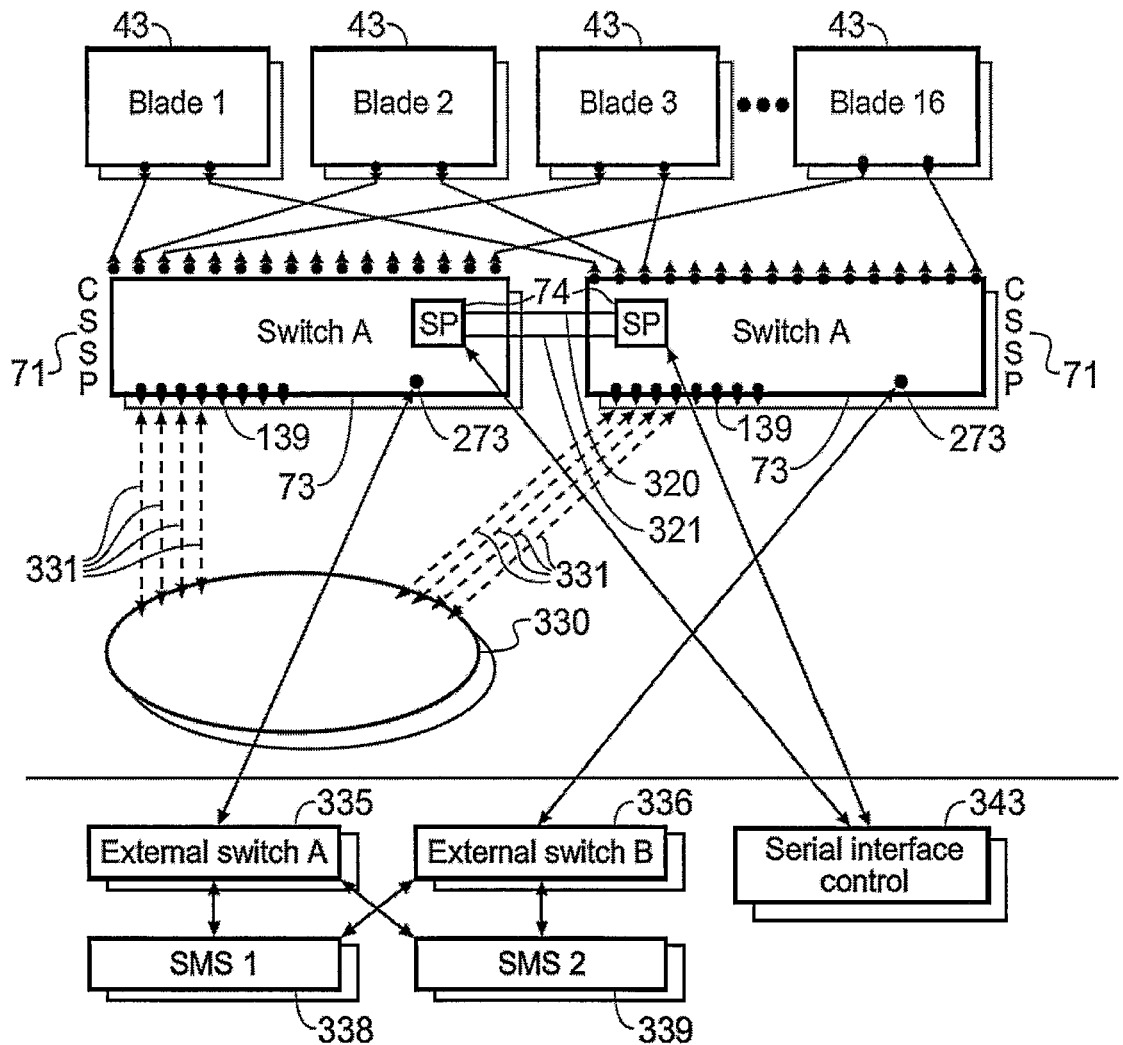
FIG. 8 is a functional block diagram showing the external connectivity of the shelf of FIG. 2.

The system management server (SMS), of which two (338 and 339) are typically provided as a clustered pair for redundancy (as illustrated in FIG. 8), is in the present example configured to provide the following functions. The primary use of the server management system 338, 339 of the present example is to provide aggregate management and monitoring for a number of shelves 41 (as illustrated in FIG. 10). By means of such aggregated monitoring and management, a single (clustered pair of) system management server(s) can oversee the running of a large number of computer system shelves 41.

The system management server (SMS) 338, 339 may also be operable to perform hardware fault failover in response to hardware failures detected by the system management server or reported to it by an SSP 74 of a particular shelf 41. In addition, the system management server 338, 339 of the present example may be operable to perform software deployment to individual processing cartridges. In alternative arrangements, the system management server 338, 339 may be operable to allow platform specific abstraction.

A platform is to be understood to be a system with a single point of presence for management of the hardware. This may for example, in a system of the type described herein comprise a shelf containing multiple servers or it may be a single server, for example a shelf-wide server. A single platform may thus have one or more associated domains, wherein a domain forms an instance of an operating system (e.g., a Solaris® operating system) supporting applications/services based on the operating system software interfaces.

By platform abstraction is to be understood that the SMS 338, 339 may be operable to allow platform specific abstraction such that the user may configure computing services without knowledge of the underlying hardware providing these services. For example a user may require a web server which can cope with, say, 1000 connections per hour. The SMS 338, 339 may be pre-configured with enough platform specific data to determine how many blade servers are required to fulfil this requirement, based on their processor, memory size, etc and provision the web service on that number of blade servers without the user needing to know anything about the server hardware details himself.

The operation of the system management server 338, 339 may be controlled via a management network 366, such that control may be automated (via a higher level of system management) or manual (via a terminal to the management network 366) or a mixture of both. The system management server 388, 399 may also be directly connected to a management terminal 365 for direct operator control of the particular system management server. In order that the above functions may be implemented in the system management server, the system management server may be configured to have a level of intelligence appropriate to the making of decisions and controlling of failover and deployment.

The management can include in-band and out-of-band management. In-band management gathers information directly from an operating system domain to which it relates. This may include both hardware and software (OS/services/application) information. Such information may only be available when the operating system domain and any associated agent-ware is functional. Out-of-band management gathers information about platform hardware by a route other than directly from an operating system domain to which it relates. For example, management through a Service Processor (SP) is considered herein to be out-of-band management. Such information can be available regardless of the state of any OS domain to which it relates.

In a network connected system as described above, a mechanism is needed to provide effective remote management of the components of the network connected system. In particular, a mechanism is needed for the automatic generation of an object model for managing a computer system. In this context, the generation of the object model is to be understood to include not only the initial creation of the object model, but also the maintenance of the object model.

An example of the invention provides an apparatus and method for generating an object model for providing effective remote management of the components of such a network connected system or device as that described above. It further provides an architecture that enables the incorporation in an effective manner of new platforms to be managed. Examples of the invention can provide a mechanism whereby management interface(s) can be supported through a flexible distribution of the management system architecture regardless of the capabilities of the computer system being monitored.

Figure 11:
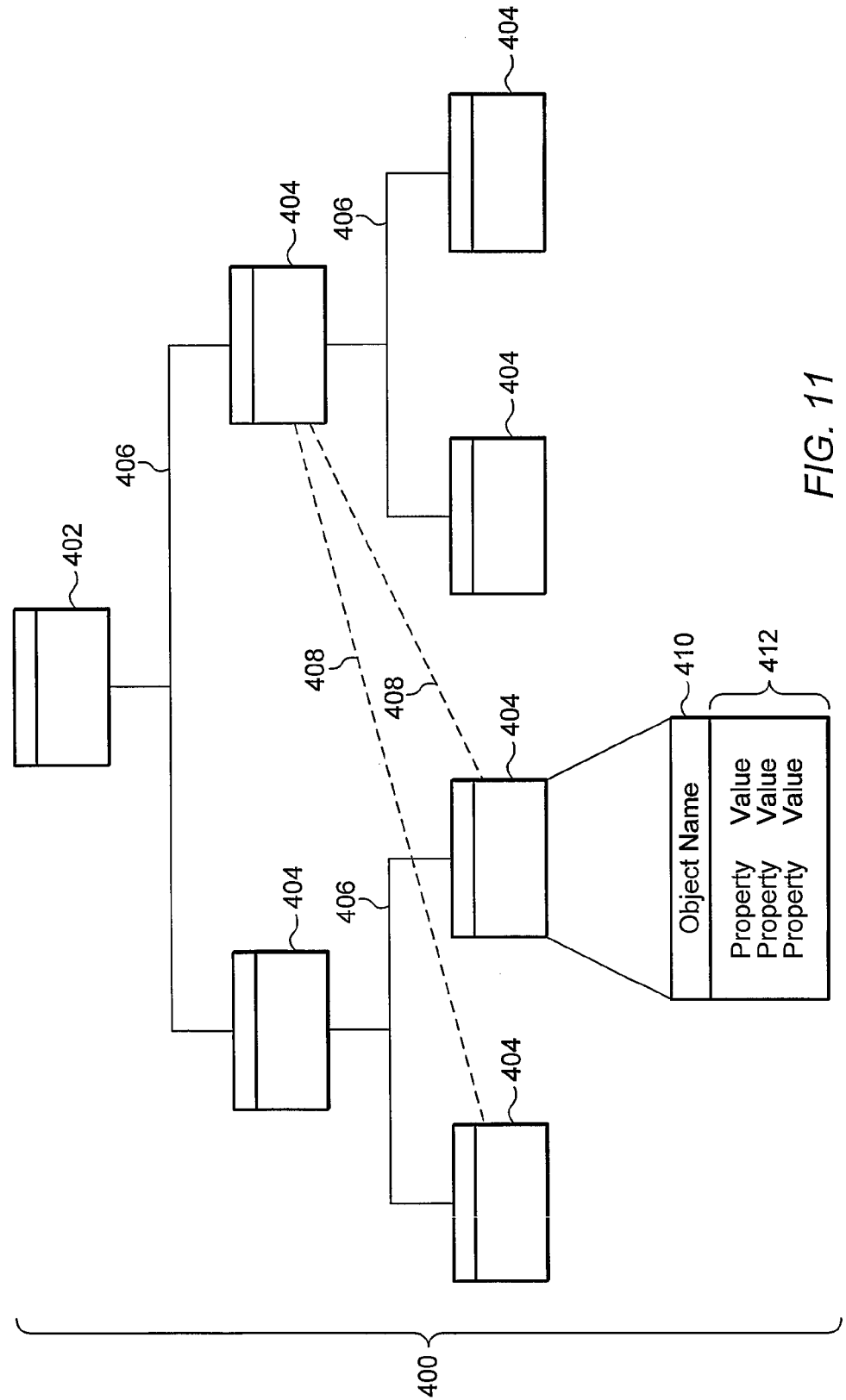
FIG. 11 is a schematic representation of an object model for system management.

FIG. 11 is a schematic representation of an object model 400 for use in management of a computer system. The object model comprises a structured hierarchy of objects 404 including a root object 402.

The object model is created and maintained using assemblies. An assembly is a component of the object model. It may be a single property, a single object, or it may be a set of objects and their associations, and it may contain other assemblies. An assembly is used to describe a part of the object model that is constructed as a single unit. Accordingly, the object model is constructed from an assembly of associated assemblies.

The fundamental quanta of management information are the property values 412 which can be incorporated in objects 404 identified by object names 410. The property values represent the level of information supported by the object model architecture from the most basic of managed systems. Such properties might include static information, such as inventory, temperature readings and system state. Instrumentation at the property level can be addressed by data acquisition modules (component/instrumentation modules) that communicate with underlying platform interfaces.

Object-oriented management information can be exposed, whereby the characteristics of specific system resources are represented by collections of properties which may be manipulated as a single entity. Such objects might include representations of field replaceable units, capacities, processors, memory, etc. Instrumentation at the object level can be addressed by software components that aggregate these properties to create higher-level management information.

The resources are not only represented as a set of managed objects 404, but also by associations 406, 408 between them. Such associations are used to represent, for example, the location of FRUs in their receptacles. The associations can include so-called containment associations 406 and secondary associations 408. At this level of complexity, the representation is considered to be a complete object model. The maintenance of such objects and those which define the associations between them is handled by an object manager software component.

In order to present such an object model to management applications, it must be exported via a management interface. Such management interfaces include, for example, the Simple Network Management Protocol (SNMP), Web-Based Enterprise Management (WBEM), and Java Management Extensions (JMX). Each management interface can be supported by an adapter that provides the necessary mappings from the object model to a management protocol and schema.

The distribution of the modules that form the management system architecture is flexible in that the interfaces between them may be local or remote. Furthermore, the distribution is such that objects may be populated with properties from a variety of data acquisition sources and the object model may similarly be constructed using objects from more than one source. The flexibility of this architecture enables it to be used as a generic management system, for example configured as an agent, which can be used to instrument a wide variety of computer resources, for example from those that may host the entire agent architecture to those which use a proxy because they are only able to provide data properties.

An example application of the management system is as a distributed agent architecture that hosts the object model and interface adapters on a system that retrieves object-level management information from a monitored system's system controller (e.g., a SSP) and additional properties from other interfaces of the monitored system. An example of the present invention can be implements on, for example, a server in a rack system of a computer system such as described with reference to FIGS. 1 to 10 (e.g., in the System Management Servers (SMSs) 338, 339 shown in FIG. 10).

A management subsystem can be configured to include a platform independent management module that provides a platform-independent interface for monitoring system resources, and a platform-specific module for each platform to be managed that maps the platform-independent interface to a native platform interface.

In the following description, the platform-independent module will be referred to as a Platform Object Manager (POM) and a platform-specific module will be referred to as a personality module. In an example of the invention, a personality module is a platform-specific component that is created for each new platform to define the hardware configuration of a platform both statically and dynamically. A personality module can communicate events to the POM, for creating and maintaining a hardware model of the platform held at the POM.

Figure 12:
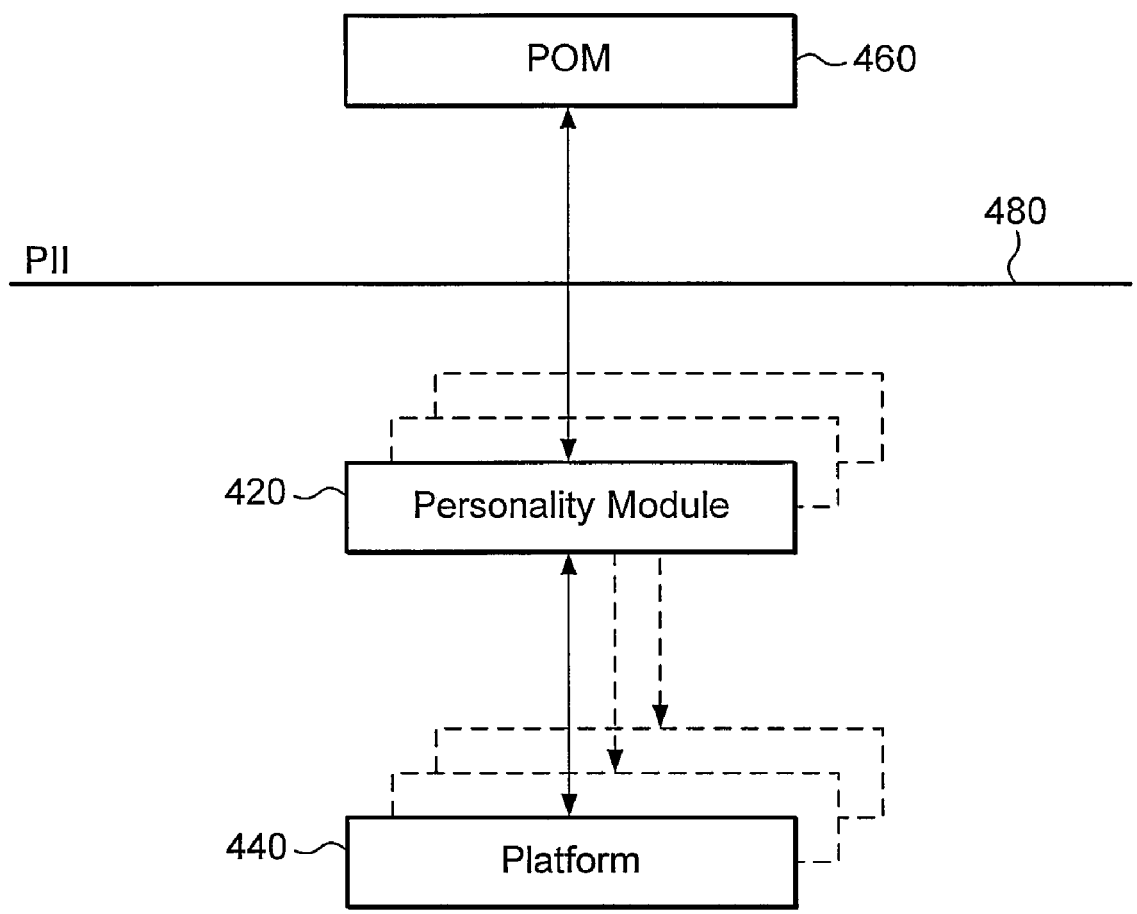
FIG. 12 is a schematic representation of the relationship between a platform-independent system management module and a platform-specific management module.

FIG. 12 is a schematic representation of the relationship between a POM 460, a personality module 420 and a platform 440. A different personality module can be provided for each platform type that is being managed. The POM 460 and the personality module(s) 420 communicate via a Platform Instrumentation Interface (PII) 480. The PII 480 is an object-oriented interface that exports hardware configuration and monitoring information, expressed in terms of the Common Information Model (CIM), up to the POM 460. The PII 480 provides property set and refresh operations, and events.

A CIM model enables overall management information in a network/enterprise environment to be described. CIM comprises a Specification and a Schema. The Specification defines the details for integration with other management models, while the Schema provides the actual model descriptions. The CIM schema can model physical and logical entities, as well as associations (for example "realized by" associations) between logical and physical entities. In other words, a logical entity can be realized by a given physical entity as represented by a realizes association.

The use of an architecture employing a platform-independent POM and platform-specific personality modules provides a number of benefits.

Some of these relate to reducing the time needed to add support for new platforms by reducing the amount of re-work that needs to be done for new platforms, as well as improving the reuse and modularity of a management system.

Instrumentation for the management system can be limited to the personality modules, which also improves modularity and reusability. In an embodiment of the invention hardware and data plugins can be used to enhance the reusability of instrumentation.

Flexible mapping to lower-level instrumentation can further be achieved. The personality modules are typically not tied to a particular lower-level instrumentation interface and do not need to hard-code mappings to lower-level interfaces.

The discovery of hardware configuration and the monitoring of hardware resources for given hardware components subsystems can often be mapped to a common lower-level instrumentation interface, which enables the use of reusable component modules (in the present example implemented in part by hardware plugins). Reusable information can be encapsulated in hardware plugins. For example, it may be observed that the configuration and monitoring of fans on a wide range of platforms can be effected through a particular lower-level instrumentation interface. However, there may be counter-examples where a suitable lower-level instrumentation interface does not exist. In such a case, it may be necessary to hard-code this information instead into a platform-specific hardware plugin to be shipped with the personality module for a platform.

As mentioned above, a personality module is operable to present a platform-independent, object-oriented model of a platform's hardware through the PII 480 to the POM 460, by determining a platform's configuration and creating objects to provide monitoring and control capabilities for instances of CIM classes represented in the POM. A personality module can also provide the ability to monitor a platform's hardware and to exercise control over manageable aspects of a platform's hardware. The personality module represents the hardware of a platform by packaging together a set of component modules (in the present example implemented by a combination of so-called hardware plugins and data plugins) around a common personality module framework. A personality module can also provide a fault injection mechanism to artificially inject faults into a configuration model (536, FIG. 15), in order to aid testing. The configuration model is a collection of one or more hardware plugin instances, each of which consists of one or more instances of classes defined in a CIM Model. The configuration model stores instances which provide monitoring the CIM instances in the POM.

Figure 13:
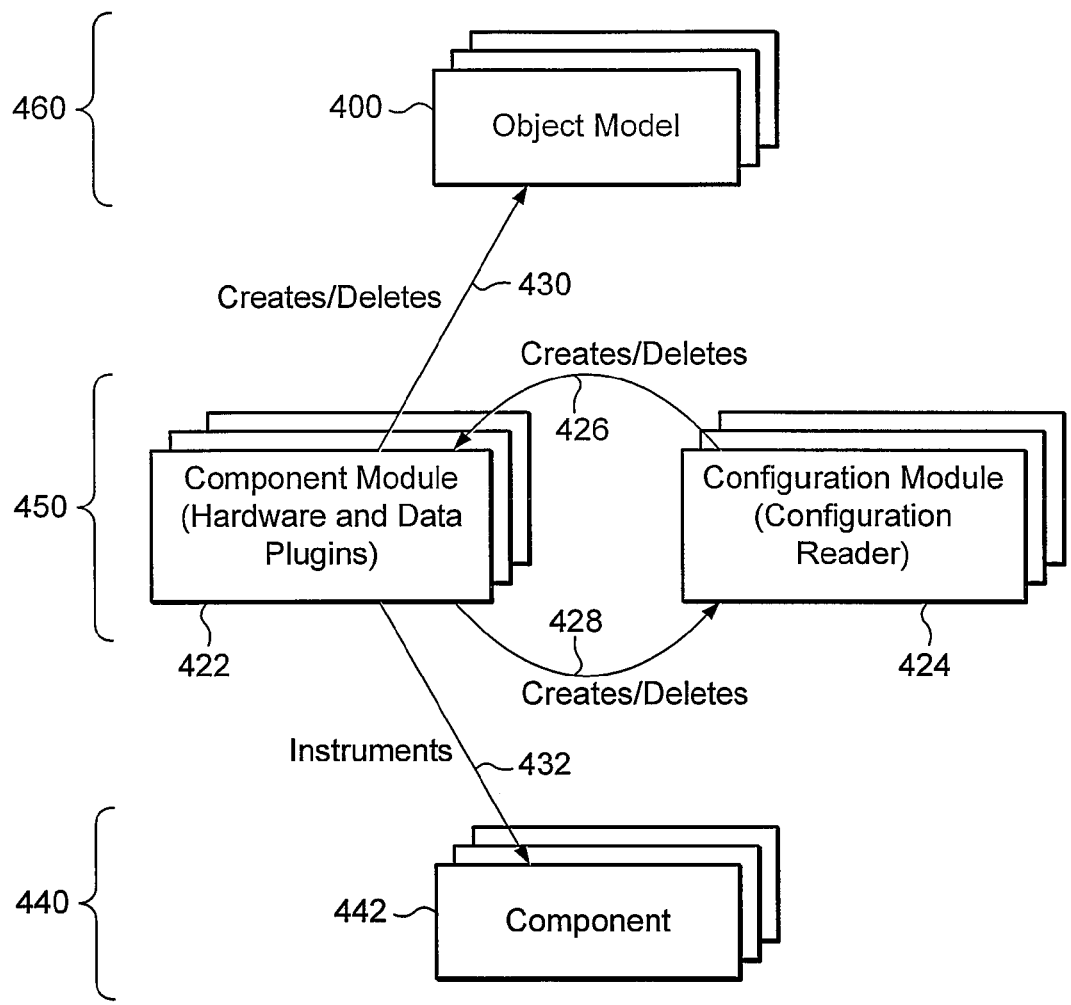
FIG. 13 is a schematic representation of the relationship between components for generating an object model as illustrated in FIG. 11.

FIG. 13 gives an overview of an example implementation. At the level of the platform 440, the various components 442 of a computer system are represented schematically. The respective components can comprise any sort of component (typically hardware components) including such things as fans, power supplies, motherboards and, for example, server blades.

Between the platform 440 and the object model 400, the management system 450 is operable to generate (i.e. create and maintain) the object model 400. The modules that are responsible for this could be implemented in the personality module 420, or partially in the personality module and in the POM 480. The management system could therefore comprise the personality module 420, or the combination of the personality module 420 and the POM 460.

As represented in FIG. 13, configuration modules 424 are responsible for creating and deleting 426 component modules 422, and the component modules 422 are themselves responsible for creating and deleting configuration modules 424. This recursive arrangement facilitates the creation of a structured object module in a flexible and potentially distributed manner. For example a component module can instantiate a configuration module, which in turn can instantiate a further component module and so on.

FIG. 13 illustrates a plurality of component modules 442. The component modules 442 are operable to generate (i.e. create and maintain) 430 an assembly of assemblies, objects and properties form the object model 400.

The component modules 442 include files defining mappings from instrumentation of the components 442 to objects representing those components for the object model 400. The component modules 442 of FIG. 13 can define mappings at respective different levels of abstraction. For example, a component module can define a mapping for a single component property at a first level of abstraction. Another component module can define a mapping for a set of component properties forming an object at a second level of abstraction. A further component module can define a mapping for an assembly of associated objects at a third level of abstraction.

The component modules 442 of FIG. 13 can also include configuration files defining expected objects and associations and methods defining instrumentation policy for properties (e.g., fixed, static, dynamic). A component module for a component can thus define a behavior of the object representing the component. A dynamic configuration module can configure a component module dynamically at run time for a component that is subject to dynamic changes in status and can further monitor the component for a change in status. A static configuration module can configure a component module statically at run time for a component having static properties for a given invocation of the computer system. A fixed configuration module, or configuration file, can configure a component module fixedly at run time for a component having fixed properties for any invocation of the computer system.

In other words, support can be provided for the construction of object models both with respect to the population of the properties of the objects in the model, and of the instantiation of the objects themselves together with any objects representing associations between them.

In the example embodiment described hereinafter, a component module for a component can also identify an instrumentation module defining a source (432) of instrumentation for the component. The instrumentation modules (not explicitly shown in FIG. 13) provide a mechanism for accessing instrumentation from the components 442 of the platform. In this example, therefore, the component module indirectly defines a source of instrumentation using the instrumentation modules. The provision of separate instrumentation modules enables the instrumentation modules to be shared between component modules. It will be appreciated that in other examples the component module could directly define a source of instrumentation. Accordingly, in FIG. 13, the component module 422 is intended to represent not only the component modules, but optionally the instrumentation modules.

An instrumentation module can export an object-based representation of the instrumentation data via an instrumentation interface. An instrumentation module can include a general part (typically a generic part) and a specific part. The general part can communicate with the specific part via a private interface to obtain instrumentation data. The specific part can interface with instrumentation for the component to obtain said instrumentation data. The general part and the specific part can be local to each other. The specific part can alternatively be remote from the general part, the general part being operable to communicate with the specific part via a remote access mechanism. The instrumentation modules can be shared between component modules.

A library of component modules and/or instrumentation modules can be provided, which component or instrumentation can be used "as is", or can be specialized.

In one example embodiment to be described in the following, the component modules can be formed by so-called hardware plugins and the instrumentation modules can be formed by so-called data plugins.

Configuration modules (in the example embodiment described in the following, these are termed configuration readers) permit a personality module developer to define the configuration (consisting of managed element instances and association instances) of a platform. The configuration modules instantiate the component modules to generate assembly of objects and are operable to enable the "assembly of assemblies". When creating a personality module, the developer defines the mechanisms for determining the hardware plugin's hardware configuration through one or more configuration modules. The configuration modules can take three forms, namely fixed, static and dynamic). Fixed configuration modules provide for configuration defined a priori (fixed configuration), i.e. the configuration information is defined for all instances of the hardware plugin. Static configuration modules can be implemented as methods that provide for configuration defined at run-time (static configuration), after which it is fixed. Dynamic configuration modules can be configured as methods that provide for configuration that can change dynamically (dynamic configuration), such as hardware components being hot-plugged.

Figure 14:
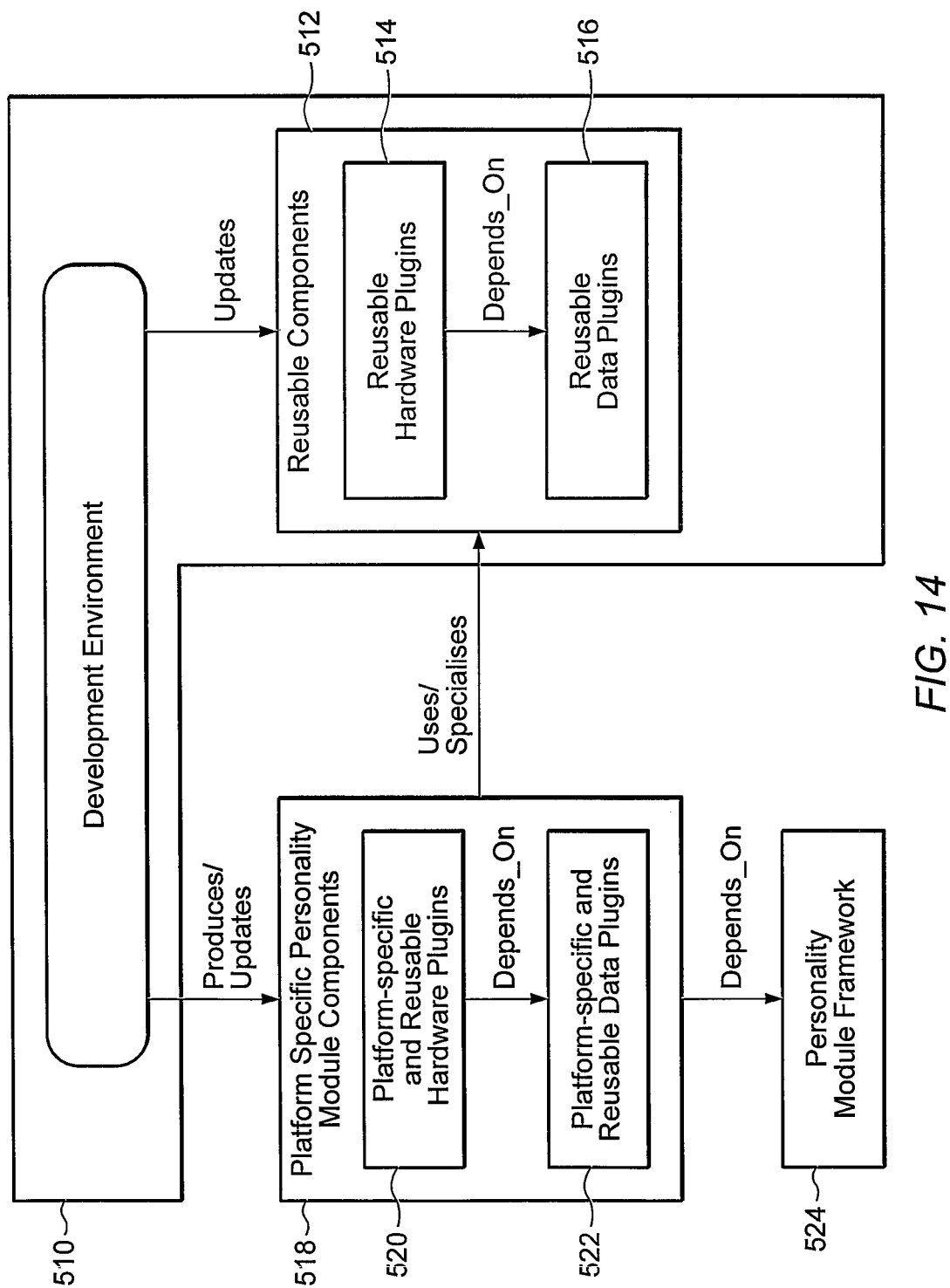
FIG. 14 is a schematic representation of the relationship between various components of a platform-specific management module.

FIG. 14 illustrates an example of relationships between various personality module components with respect to a platform-independent development environment 510, which can provide an environment for the development and creation of personality modules. A platform-independent library of reusable components 512 can provide a set of reusable hardware plugins 514 and reusable data plugins 516, that can be used as-is or can be specialized. Platform specific personality module components 518 can include reusable platform-specific hardware plugins 520 and reusable platform-specific data plugins 522. The platform-specific personality module components are arranged to provide a "personality" for a specific platform. A platform-independent personality module framework 524 provides for the export of hardware information through the PII 480 (FIG. 12).

The hardware plugins are reusable components that encapsulate hardware configuration and monitoring information for a hardware component (the term "hardware component" is employed as the hardware plugins can potentially represent any hardware component from fans to power supplies, motherboards and, for example, server blades). The hardware plugins define the configuration of the hardware component through a combination of fixed, static and dynamic configuration readers, which may probe the platform to determine the actual configuration of the hardware component. They can encapsulate various types of behavior. The hardware plugins also are operable to update a configuration model.

Data plugins are reusable components that encapsulate access to and provide a common interface to both in-band and out-of-band lower-level instrumentation interfaces. Two types of data plugins are defined, termed local data plugins and remote data plugins. Local data plugins reside in the same process as the personality module. Remote data plugins reside outside the personality module process, typically on the managed platform.

Figure 15:
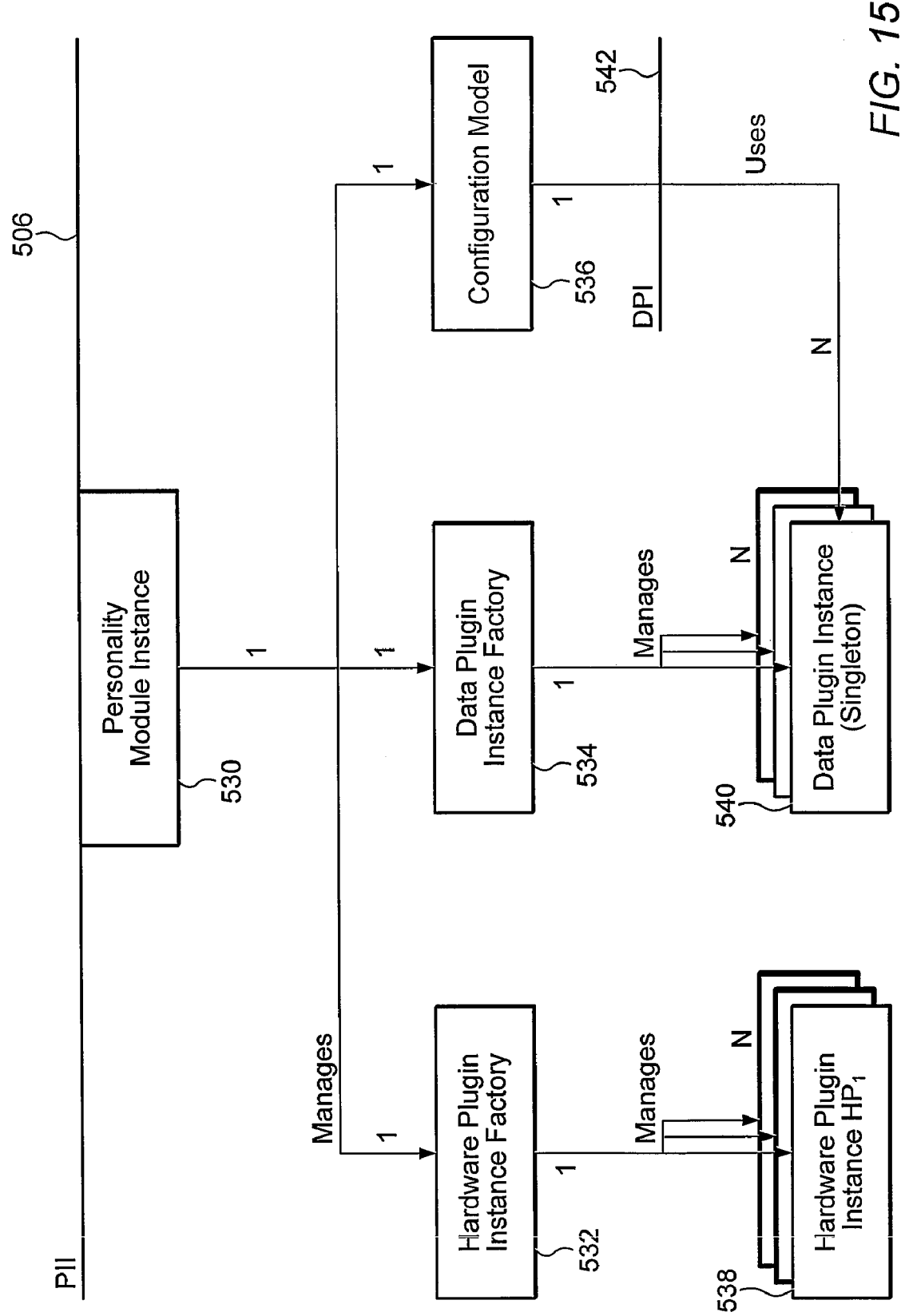
FIG. 15 is a schematic representation of run-time components of a platform-specific management module.
Figure 16:
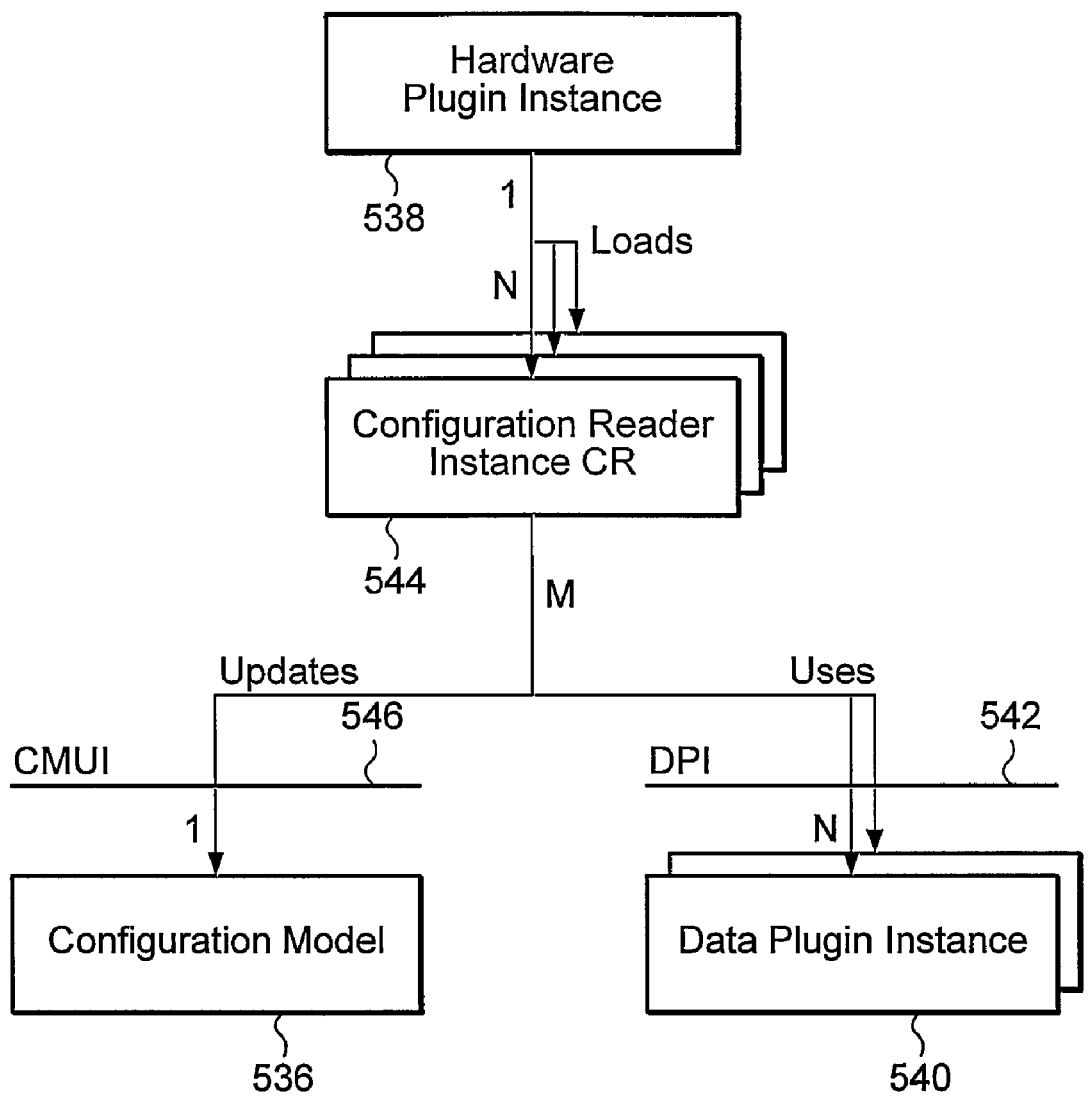
FIG. 16 is a further schematic representation of run-time components of a platform-specific management module.

FIGS. 15 and 16 are schematic representations of run-time personality module components.

FIG. 15 illustrates that a personality module instance 530 can be operable to manage a hardware plugin instance factory 532, a data plugin instance factory 534 and a configuration module 536. The personality module instance 530, the hardware plugin instance factory 532, the data plugin instance factory 534 and the configuration module 536 form components of the personality module framework 524 (FIG. 12). The hardware plugin instance factory 532 manages one or more hardware plugin instances 538. The data plugin instance factory 534 manages one or more data plugin instances 540. The data plugin instances 540 form runtime components that can be used by, and shared between, the hardware plugin instance 538. The configuration module 536 can also use the data plugin instances 540 via a Data Plugin Interface (DPI) 542. The data plugin interface 542 is an interface that is common to all data plugins.

FIG. 16 illustrates that manner in which a hardware plugin instance 538 can be operable to load one or more configuration reader instances 544. The configuration reader instances 544 can access the data plugin instances 540 via the DPI 542. The configuration reader instances 544 are also operable to update the configuration model 536 via a Configuration Model Update Interface (CMUI) 546.

The CMUI has two parts, a Configuration Model Toolkit Update Interface (CMTUI) and a Configuration Model Developer Update Interface (CMDUI). The CMTUI is used internally by a personality module framework and toolkit hardware plugins only and provides for a number of different operations. The toolkit (not shown) provides a library of generic hardware as data plugins.

Four examples of such operations are indicated below as (1) to (4).

1) An add managed element instance operation (CIM Class-Name, Instance Name, Hardware PluginInstance Name) is used to add a managed element instance to the configuration model as a child of the specified hardware plugin instance. Hardware plugin instances representing hot-plugable resources are monitored by dynamic configuration readers.

2) An add association instance operation (Association CIM-Class Name, Instance Name, Hardware Plugin Instance Name, Antecedent Instance Name, Dependent Instance Name) is used to add an association instance to the configuration model as a child of the specified hardware plugin instance.

3) An add hardware plugin instance (Hardware Plugin Instance Name, Hardware Plugin Name) is used to add a hardware plugin instance to the configuration model as a child of the specified hardware plugin instance.

4) A remove hardware plugin instance (Hardware Plugin Instance Name) is used to remove a hardware plugin instance from the configuration model. In this example, hardware plugin instances are the only instances which can be explicitly added and removed from the configuration model, in order to represent hot-pluggable resources.

The CMDUI is used by hardware plugin configuration readers created by personality module developers and allows access to only operations 2 to 4 above. Hence, developer-created configuration readers are only able to add and remove hardware plugin and association instances; they are not exposed to individual CIM managed element classes. This preserves the CIM mapping encapsulated by a hardware plugin and limits the exposure of Personality Module developers to the CIM model. The ability to nest hardware plugins means that a nested hardware plugin is given its instance name by its encompassing (or "parent") hardware plugin.

In FIGS. 15 and 16, an indication "1" represents a single component and "N" represents a number of one or more components. "M" represents that each configuration reader instance 544 can use the data plugin instances 540 and update the configuration model 536. The one or more hardware plugin instances 538 can be of two types, namely a generic hardware plugin used as-is from the toolkit and a platform-specific hardware plugin which is composed of (specializations of) toolkit hardware plugins. The one or more toolkit data plugins can encapsulates a lower-level instrumentation interface.

The personality modules are essentially stateless; that is, they store only as much configuration information at run-time as is necessary to perform monitoring and control of a platform after initialization. Their main purpose is to allow developers to define the hardware configuration of a platform in the form of a set of hardware plugins which map hardware components to the applicable CIM Model. Hardware configuration information can be passed up through the PII interface (480, FIG. 12) as a stream of lifecycle events (such as hardware resource instance creation and association instance creation events) to the POM (460, FIG. 12). CIM alerts can also be passed up through the PII as events. The POM can express an interest in event types by registering an event listener using the PII. Instances in the configuration model perform monitoring and control for CIM instances represented in the POM. This is accomplished by interfacing with data plugins as shown in FIGS. 15 and 16.

Various types of traffic can flow over the PII. Discovery information is passed to a personality module instance when it is created in order to identify the machine it is representing and monitoring. This discovery information is an IP address which identifies the machine itself for a single-domain platform, or the service processor for a multi-domain platform formed by a shelf. If the service processor is able to pass domain IP addresses to personality modules so that they can communicate in-band with the domains; this information is likely to be cached inside data plugins.

A PII client (i.e. the POM) is able to perform various types of requests, including:

1) event requests such as:

1.1) event registration (accomplished by the client passing an event filter and an event listener/handler—an event filter allows the client to specify the type of event of interest);

1.2) instance creation (creation of a managed element instance or an association instance for an association between managed elements);

1.3) instance removal (removal of a managed element instance or an association instance for an association between managed elements); and 1.4) instance change (change of a managed element instance or an association instance for an association between managed elements);

2) listen (register an event listener—to which a status value is returned);

3) getPropertyValue (get a specified property value for a specified instance—to which a CIM value is returned);

4) setPropertyValue (set a specified property value for a specified instance—to which a status value is returned);

5) executeMethod (execute a CIM instance method—a CIM value with the return type of the method being called is returned, or an error message will be returned if the method is not supported); and 6) enumerateClasses (returns a list of all the CIM classes supported by the personality module).

In operation, a personality module is loaded (or instantiated) by the POM in response to a discovery operation. The POM passes as a parameter to the initialization mechanism discovery information, including at least an IP address. Before invoking the initialization mechanism of a personality module, the POM will register an event handler to receive instance creation events for all classes so that the POM can begin building a CIM model of the platform when the personality module starts to initialize itself.

A personality module instance initializes itself by loading/instantiating all defined hardware plugins (and any data plugins on which they depend), which determine the configuration (hardware resources and their associations according to a CIM model) of the managed machine. This configuration information is communicated to the POM as a sequence of events through the PII. The POM uses these events to construct a model of the machine based on the CIM Model.

After initialization, the personality module instance begins to monitor the platform for changes, sending these up to the POM through the PII as events. It also responds to set operations and method calls sent through the PII from the POM, in addition to property update semantics.

The hardware plugins can provide reusable CIM representations for hardware resources such as system controller cards, power supplies, memory modules, tape drives, motherboards, that is anything from single hardware resources to hardware sub-assemblies. They encapsulate the mapping from a physical hardware resource to its representation as a number of classes in the CIM Model, thereby encapsulating the rules about how the representation of the hardware resource should be mapped to the CIM Model. Hardware plugins also encapsulate behavior, such as how to monitor the status of sensors and to control the hardware e.g., CPU reset.

Existing hardware plugins (e.g., from the toolkit library) can be reused when developing new personality modules either as-is or by specializing them in some well-defined way. Their potential reusability is based on the observation that the following types of behavior are examples of behaviors that are potentially reusable.

1) Probing for configuration information.

2) Monitoring hardware resources.

3) Mapping of platform hardware components (whether they are generic, such as a motherboard, or platform-specific, such as a given platform's motherboard) to their representations in the CIM Model.

4) Mappings to lower-level instrumentation interfaces in order to determine the actual configuration of a hardware component, or to monitor the value of a property, or to perform control. For many hardware components, the mapping to low level instrumentation interfaces will be the same across many platforms. However, this is not always be possible, which is why hardware plugins permit flexible (i.e. changeable) mappings to low level instrumentation interfaces.

Hardware plugins are developed to model, monitor and control some (set of related) hardware component(s) of a platform, such as fans, motherboards, CPUs, blades etc.

They can be instantiated as many times as required to represent a number of instances of a hardware component for a given platform.

Hardware plugins should be configured to be reusable, wherever possible. However, there can be some platform specifics for each platform, and in this case it may be desirable to encapsulate these platform specifics in one or more platform-specific hardware plugins. For example, a fan assembly (consisting of a fan and its tachometer) can be represented using a reusable hardware plugin because a fan assembly is fairly similar across many platforms (it has the same properties, always consists of a fan and tachometer, and is likely to interface to the same lower-level instrumentation interfaces in order to update its properties). A motherboard, on the other hand, is fairly unique because it is likely to differ from other motherboards by having different components on it. A developer may, however, choose to develop a generic motherboard hardware plugin that interfaces with a lower-level instrumentation interface in order to determine a specific motherboard's components in a fairly generic manner i.e. the developer may be able to use a lower-level instrumentation interface which is common to many platforms and which furnishes the developer with all the information required to determine which components lie on the platform's motherboard.

Hardware plugin configuration can be defined using a combination of three approaches.

1) Fixed, where the configuration is defined by a fixed configuration reader and is fixed a priori for the hardware-plugin.

2) Static, where the configuration is defined at run-time (i.e. on a per-hardware-plugin-instance basis) by a static configuration reader, after which it is fixed.

3) Dynamic, where the configuration is defined on a per-hardware-plugin-instance basis at run-time by a dynamic configuration reader. Each hardware plugin could potentially represent a type of hardware subsystem such as a motherboard, rather than the motherboard of a particular platform. In addition, dynamic configuration can change during the lifetime of the hardware plugin instance in order to represent, for example, hot-plugable hardware components.

Each hardware plugin encapsulates a mandatory, reusable mapping to the CIM model. Other aspects of hardware plugins, such as how property values are calculated, are also reusable but they can also be re-configured. For example, the way properties are instrumented (i.e. which data plugins they use) can be overridden by providing a new mapping to another data plugin.

Figure 17:
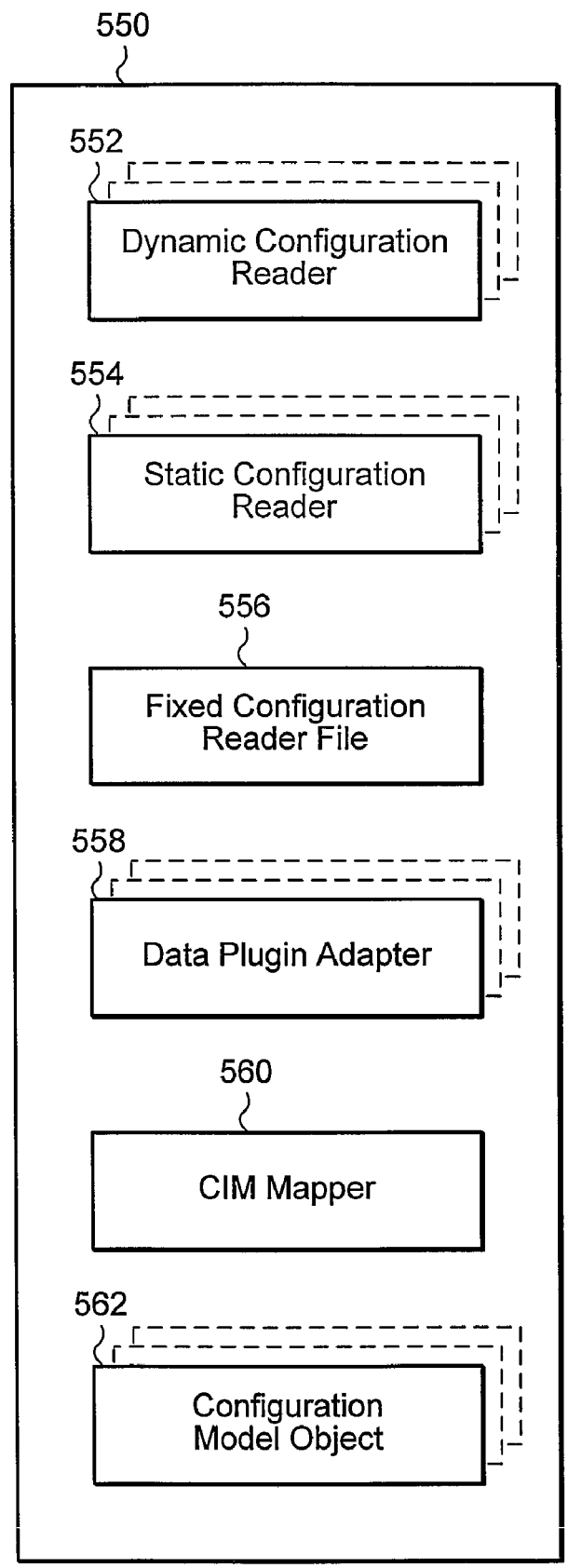
FIG. 17 is a schematic representation of components of a component module in the form of a hardware data plugin.

Each hardware plugin can comprise a number of components as represented in FIG. 17, which illustrated the components of an example of a hardware plugin 550. One or more dynamic configuration readers 552 can be operable to create hardware plugin configuration dynamically (i.e. at run-time). One or more static configuration readers 554 can be operable to create hardware plugin configuration statically (i.e. at run-time). A fixed configuration reader file 556 can define fixed hardware plugin configuration in a file. One or more data plugin adapters 558 can be operable to provide the capability to update and set a CIM property and call a CIM method by mapping to a data plugin. A CIM mapper 560 can be operable to provide a mapping, for each CIM class property and method defined in the hardware plugin, to one or more data plugin adapters. One or more configuration model objects 562 can be operable to provide monitoring capabilities and semantics for CIM instances and their properties.

The reusability of a hardware plugin is dependent on the platform-specificity of the lower-level instrumentation interfaces it uses to probe the hardware configuration and calculate property values. If the hardware plugin can be implemented generically i.e. expressed in terms of platform-independent lower-level instrumentation interfaces, then it will in general be reusable. The use of fixed configuration readers in hardware plugins typically will weaken their reusability because this type of configuration information is usually platform-specific. For example, cooling associations between hardware resources are difficult to determine purely from lower-level instrumentation interfaces. This is an example where fixed configuration readers can be used to express cooling associations statically on a per-platform basis.

A hardware plugin encapsulates mapping to the CIM Model for the hardware component it represents. This is performed by the configuration readers of the hardware plugin as they add instances to the configuration model through the CMUI.

Hardware plugins load a number of configuration readers in order to determine the actual configuration of a hardware component. The output of a configuration reader consists of instances of classes defined by the hardware plugin which represent classes defined in the CIM Model. This effectively maps the hardware component to a representation based on the CIM Model, which is fixed for each hardware plugin.

Each hardware plugin represents a hardware component using one or more CIM classes, each of which is a CIM class from the CIM Model. For example, a motherboard may be represented as a CIM_Card with a HostingBoard property set to "true". There are two major types of CIM class:

association classes, which relate exactly two managed element classes; and managed element classes, which represent everything else such as the physical and logical representation of hardware resources, configuration information etc.

CIM instances represented in the configuration model are uniquely identifiable because, amongst other reasons, association instances need to be able to uniquely identify instances in their references. A CIM model can be used by the POM and personality modules to define and represent hardware configuration information identifies instances by CIM object paths, which consist of the unique set of property keys that uniquely identifies an instance.

In many cases, there will be many potential sources of low level instrumentation and therefore many different data plugins to choose from in order to calculate property values, perform property set and execute methods. Hardware plugins are configured in such a way that property calculation, property sets and method execution are all expressed in terms of data plugin adapters. Each toolkit hardware plugin will include a set of one or more data plugin adapters, each of which interfaces with a number of data plugins to instrument a number of properties and methods for the hardware plugin. Data plugin adapters also encapsulate how each property is expressed in terms of the data plugin properties, which may be different for each type of data plugin. The reason for permitting one or more data plugin adapters is to allow a hardware plugin to be instrumented from more than one data plugin source, which affords flexibility. Configuration Readers output the actual configuration of the hardware component through the CMUI.

Configuration readers permit a personality module developer to define the configuration (consisting of managed element instances and association instances) of a platform. When creating a Personality Module, the developer defines the mechanisms for determining the hardware plugin's hardware configuration through one or more configuration readers.

As mentioned above, configuration readers can take three forms, namely fixed, static and dynamic. They populate the configuration model through the CMUI. A configuration reader can either form part of a toolkit hardware plugin (a toolkit configuration reader) or a part of a personality module-specific hardware plugin (an external configuration reader).

Fixed configuration readers provide for configuration defined a priori (fixed configuration), i.e. the configuration information is defined for all instances of the hardware plugin. It can be defined in a fixed configuration text or XML file (556, FIG. 17) and read by a fixed configuration reader. A text configuration file defines fixed configuration information in the form of a text file. An XML configuration file defines fixed configuration information in the form of an XML file. There is generally only one fixed configuration reader per hardware plugin. However, more can exist in order to improve modularity, if need be.

The Fixed Configuration Text and XML Readers read configuration information and populate the Configuration Model using the CMUI. Fixed configuration information for a fixed configuration text file is delivered in the form of fixed configuration text files, one per hardware plugin. This configuration file permits the toolkit developer to state the fixed nested hardware plugin and CIM instances for the hardware plugin. Static and dynamic instances are defined using static and dynamic configuration readers, respectively.

Static configuration readers (554, FIG. 17) can be implemented as methods that provide for configuration defined at run-time (static configuration), after which it is fixed. It can be used to represent configuration on a per-hardware-plugin-instance basis. Static configuration is created by static configuration readers interacting with the CMUI. There can be many static/dynamic configuration readers per hardware plugin, but they can instantiated only once each. A static configuration reader can thus configure a static object for a system element having static properties for a given invocation of the computer system. Static configuration readers can thus be used to define objects that are added to the model based on some interaction with the system being monitored and are employed to create portions of the object model which may vary upon each invocation of the configuration reader, but will not change thereafter. Static configuration readers can define (potentially complex) behaviors and are procedural in nature. They can be represented by code or rule sets.

Dynamic configuration readers (552, FIG. 17) can be configured as methods that provide for configuration that can change dynamically (dynamic configuration), such as hardware components being hot-plugged. Dynamic configuration reader can be used to represent configuration on a per-hardware-plugin-instance basis. Dynamic configuration is created by dynamic configuration readers interacting with the CMUI, which can determine configuration information for replaceable and hot-plug components, and to detect appropriate hot-plug events from a data plugin in order to adjust the configuration model accordingly. There can be many static/dynamic configuration readers per hardware plugin, but they can be instantiated only once each. A dynamic configuration reader is thus able to configure a dynamic object for a system element having dynamic properties, a dynamic object being operable to monitor the system element to reflect changes in status of the system element. Thus dynamic configuration readers can be used to define objects which may be added to, or removed from, the object model at any time. They are therefore not just invoked to construct the model, but perform a constant monitoring task, ensuring that the object model remains representative of the monitored system. Dynamic configuration readers define (potentially complex) behaviors and are procedural in nature. They can be represented by code or rule sets. A typical application of a dynamic configuration reader is to monitor the occupancy state of a Field Replaceable Unit (FRU) receptacle, detect when a FRU is inserted or removed, and update the object model accordingly. In this example the insertion of a FRU may lead to the dynamic configuration reader invoking a static configuration reader representing the identified FRU.

Combinations of static and dynamic configuration readers will typically be employed. For example, the representation of the FRU receptacle and the FRU mentioned above could be controlled by static configuration, whilst the invocation of the FRU's static configuration reader, and the instantiation of object(s) associating the FRU and receptacle, can be controlled by the dynamic configuration reader.

A hardware plugin configuration file contains a list of the instrumentable properties and methods, along with type, behavior and semantic information. For example a "HardwarePluginPresent" property in a hardware plugin can define the monitoring behavior of an instance of the hardware plugin by mapping it to a data plugin adapter, or providing an actual value for fixed hardware plugins.

A hardware plugin mapper configuration file can provide a mapping for properties and methods defined in the hardware plugin configuration file to either: a data plugin adapter (DPA), which instruments the property or method; or an actual CIM value, for fixed properties.

For any property probes/sets or method calls the name is matched against the hardware plugin's mapper in order to determine which data plugin adapter is used to fulfil the request. This is accomplished by matching the property/method name against a mapper key, which is either a (hardware plugin name, CIM class name) pair or a (hardware plugin instance name prefix, CIM class name) pair. A hardware plugin's mapper file can be overridden.

At instantiation, a hardware plugin proceeds by reading its configuration file, after which it instantiates all defined fixed and dynamic configuration readers, which perform the task of determining the actual configuration. A configuration model consisting of instances is created and instance creation events are sent up to the POM through the PII. Configuration readers probe the actual configuration of the platform based on an expected/pre-defined configuration provided by the developer in the form of fixed and dynamic configuration readers. This probing produces a configuration model which represents some part of the hardware configuration of the managed machine. The configuration comprises various types of runtime behavior. For example, hardware plugin instance monitoring behavior involves hardware plugins being used to represent hot-plugable hardware components, whereby their presence is monitored (this is accomplished using dynamic configuration readers). Property monitoring behavior relates to the changing of instance properties by events from a lower-level instrumentation interface, or by lazy gets through the PII or by polling, etc. Other types of behaviors include alarm and alert generation behavior, and property calculation behavior.

A hardware plugin can interface with low-end instrumentation interfaces to obtain information for performing various tasks. For example, one task is determining the configuration of the hardware through static and dynamic configuration readers. Another task is calculating instance property values which may be a complex function of one or more low-end instrumentation sources and existing instances (for example, the value of a particular property may be dependent on the values of a set of another instance's properties, in addition to values from a low level instrumentation interface). Other tasks include determining associations between instances and detecting events such as property value change.

As mentioned earlier, data plugins are potentially reusable components which encapsulate the interfaces to in-band and out-of-band lower-level instrumentation behind a single, common Data Plugin Interface (DPI). Data plugins can be used for various tasks. For example, one task is determining configuration information about the managed machine. Another tasks is monitoring the state of the managed machine. Further tasks include getting values from low level instrumentation interfaces in order to calculate instance property values and performing control operations on the managed machine.

Data plugins facilitate the modularization and simplification of the interaction between hardware plugins and lower-level instrumentation interfaces. The data plugins provide various advantages. One advantage is the encapsulation of multi-threading behavior, even if the low-level instrumentation interface does not support this. Another advantage is the encapsulation of an interaction mechanism with the low-level instrumentation interface. A further advantages is the encapsulation of any security requirements on communications with the low-level instrumentation interface.

Figure 18:
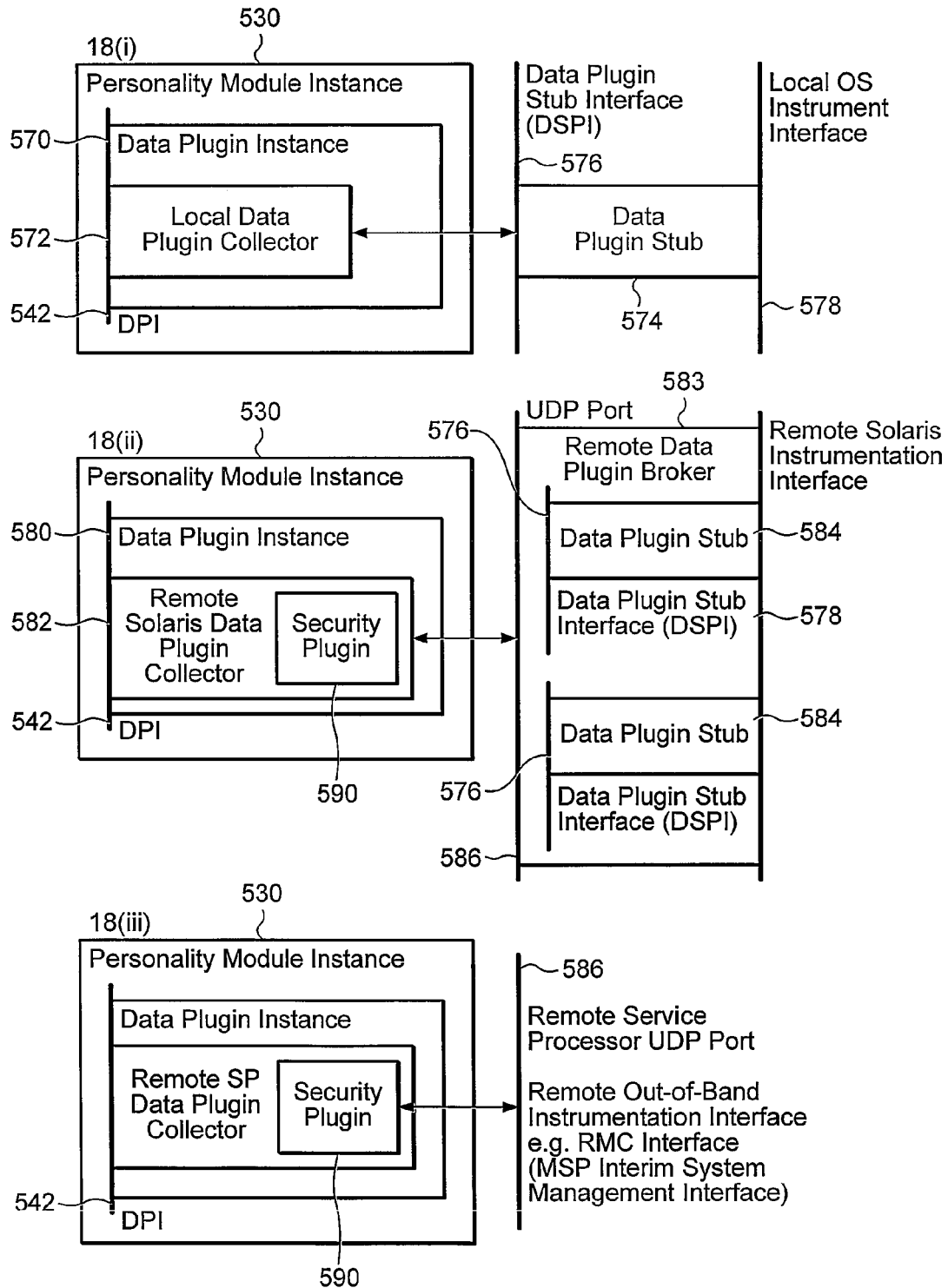
FIG. 18 is a schematic representation of examples of local and remote plugins.

Data plugins can either be local or remote as represented in FIG. 18.

FIG. 18(*i*) shows the deployment used when a Personality Module communicates with a local data plugin i.e. both reside on the same platform. Here a local data plugin 570 can run in the same process as a personality module instance 530. It comprises a local data plugin collector 572 and a local data plugin stub 574. The local data plugin collector 572 can be a generic module (e.g., predefined in the toolkit library and/or otherwise forming a generalized module), whereas the local data plugin stub 574 can typically be configured by a developer. The local data plugin collector 572 communicates with the local data plugin stub 574 via a data plugin stub interface 576. The local data plugin stub 574 can interface with the local operating system (OS) via a local instrumentation interface 578 provided by that operating system.

FIG. 18(*ii*) shows the deployment used when a personality module communicates with a remote data plugin e.g., a personality module residing out-of-band on a management service system communicates with a data plugin deployed in-band. For a remote data plugin 580, part of the data plugin, a remote data plugin collector 582, can run in the same process as the personality module instance 530 and another part, the remote data plugin broker 583 and data plugin stubs 584 are deployed elsewhere (usually in-band i.e. on the managed machine). The remote data plugin collector 582 and the remote data plugin broker 583 can be generic modules (e.g., predefined in the toolkit library and/or otherwise forming generalized modules), whereas the data plugin stubs 584 are typically configured by a developer. The remote data plugin collector 582 communicates with the remote data plugin broker 583 via a User Datagram Protocol (UDP) port 586 and with the data plugin stubs 584 via the data plugin stub interface 576. This type of data plugin supports personality module instances which are deployed out-of-band i.e. not on the managed machine, but which need to communicate in various ways. One example is communication in-band with the managed machine—in this case, personality module instances (one per managed machine) may reside on a management service system and a data plugin broker may resides on a well-defined port on the managed machine. Another example is communication out-of-band with a service processor using a suitable interface.

FIG. 18(*iii*) shows a deployment used when a personality module instance 530 communicates with an out-of-band service processor interface via a UDP port.

In FIG. 18, an interface is represented using a vertical line and is implemented by the component that is attached to the right of it. As can be seen, data plugin collectors are generic components. The types of component that need to be developed by third parties include data plugin stubs and security plugins (which encapsulates data plugin traffic, without interpreting it, in order to provide authentication and privacy where required).

Both the remote operating system and SP data plugin collectors encapsulate how to obtain instrumentation information from the interface concerned, including any port information. The only (discovery) information passed to a remote data plugin collector is the IP address of the managed machine. In addition, the mechanism with which the data plugin collector interacts with the instrumentation interface can be encapsulated within the collector. The mechanism may be accomplished through the use of a connection-oriented link, or a UDP-based link with a heartbeat mechanism. The data plugin broker may, for example, employ the use of an event-based mechanism to inform the Personality Module whether the machine hosting the broker is going down due to a suspend operation. The same data plugin stubs can be used in both scenarios illustrated in FIGS. 18(i) and 18(ii).

Data plugins export an object-based model over the DPI comprised of instances of classes, each of which consist of a set of (property name, property value) pairs. The classes and property names used are data-plugin-dependent; appropriate mappings to low level instrumentation interfaces. The supported set of property types is the set of CIM types. Using CIM types down to the data plugin layer can enable a common set of types to be used throughout the personality module architecture and simplify the interface between hardware plugins and data plugins. Data plugins can encapsulate appropriate mappings (determined by their developers) between the CIM primitive type system and the primitive type system of the low level interface. The DPI is thread-safe. If the data plugin interfaces with a non-MT-safe low level instrumentation interface, the data plugin can handle any concurrency issues by blocking the caller until its request can be dispatched and a response has been received. The locality of data plugins is not exposed to data plugin clients.

An event filter allows clients to specify which events they are interested in. An instance consists of a set of (property name, property value) pairs that represents an object in the low level interface such as a fan or power supply. An event filter defines the types of events in which the client is interested. There are three types. For instance creation, the event filter consists of a set of classes. For instance removal, the event filter consists of a set of classes. For an instance change, the event filter consists of a class filter, an instance filter and a property filter.

The Data Plugin Stub Interface (DPSI) is implemented by data plugin developers to interface with lower-level instrumentation interfaces. It consists of the same functions as the DPI, outlined above. The DPSI exports data in the form of CIM types, which means that some mapping must be created from any instrumentation interface types to the CIM types representing them.

In the present embodiment data plugins are singletons, which means that unlike hardware plugins, they are instantiated only once. At instantiation, two pieces of information are given. The first piece of information is the location of the data plugin. For a local data plugin, this is simply an indication that it is local. For a remote data plugin, this can be the IP address of the machine hosting the remote data plugin broker. The second piece of information is the name of the data plugin.

A data plugin manager is provided (not shown) which returns a handle, in the form of the Data Plugin Interface (DPI), to a data plugin instance based on this information. Clients can then interact with the data plugin instance using the Data Plugin Interface (DPI).

A remote data plugin broker listens for requests from a remote data plugin collector and passes each request on to the appropriate remote data plugin stub.

Using the management structure described above, system representations at various levels of abstraction can be presented to the user.

Optionally, as illustrated in FIG. 18, security plugins 590 can be provided for communication between remote data plugin collectors and remote data plugin stubs or SP interfaces over a secure communications link. However, in the present embodiment, management communications (including any remote data plugin stub traffic) are passed over a secure link, a security plugin need not be included. A security plugin interface can provide an interface for which security plugins can be implemented, where required, given that security requirements may be platform-specific. Once authenticated and authorized by a remote data plugin broker, a remote data plugin stub can allow full read/write access to any lower-level instrumentation interfaces it uses.

Thus, there has been described a management system for the generation of a management object model for performing management of a computer system. The object model includes a structured hierarchy of objects representing components of a computer system. The management system can include component modules operable to define mappings from instrumentation of the components to objects representing those components and configuration modules operable to configure associations between the component modules for the generation of the management object model.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A management system for generation of a management object model including a structured hierarchy of objects representing hardware components of a computer system for performing management of the computer system, the management system comprising:

a processor; and a memory coupled to the processor, wherein the memory comprises program instructions configured to implement:

component modules operable to define mappings from instrumentation of the hardware components to objects representing those hardware components, wherein one of said component modules for a hardware component identifies an instrumentation module defining a source of instrumentation for the hardware component, and wherein the instrumentation module comprises a general part and a specific part, the general part being operable to communicate with the specific part via a private interface to obtain instrumentation data, and the specific part being configured to interface with instrumentation for the hardware component to obtain said instrumentation data; and configuration modules operable to configure associations between the component modules for the generation of the management object model.

2. The management system of claim 1, wherein said component modules are operable to define mappings at respective different levels of abstraction.

3. The management system of claim 2, wherein one of said component modules is operable to define a mapping for a single hardware component property at a first level of abstraction.

4. The management system of claim 2, wherein one of said component modules is operable to define a mapping for a set of hardware component properties forming an object at a second level of abstraction.

5. The management system of claim 2, wherein one of said component modules is operable to define a mapping for an assembly of associated objects at a third level of abstraction.

6. The management system of claim 1, wherein one of said component modules for a hardware component defines a behavior of the object representing the hardware component.

7. The management system of claim 1, wherein one of said configuration modules is operable to configure one of said component modules dynamically at run time for one of said hardware components that is subject to dynamic changes in status and is further operable to monitor said hardware component for a change in status.

8. The management system of claim 1, wherein one of said configuration modules is operable to configure one of said component modules statically at run time for one of said hardware components having static properties for a given invocation of the computer system.

9. The management system of claim 1, wherein one of said configuration modules is operable to configure one of said component modules fixedly at run time for one of said hardware components having fixed properties for any invocation of the computer system.

10. The management system of claim 1, comprising a library of component modules.

11. The management system of claim 1, wherein one of said component modules comprises a plug-in module.

12. The management system of claim 1, wherein the instrumentation module exports an object-based representation of the instrumentation data via an instrumentation interface.

13. The management system of claim 1, wherein the general part and the specific part are local to each other.

14. The management system of claim 1, wherein the specific part is remote from the general part, the general part being operable to communicate with the remote part via a remote access mechanism.

15. The management system of claim 1, further comprising a library of instrumentation modules.

16. The management system of claim 1, wherein one of said instrumentation modules comprises a plug-in module.

17. The management system of claim 1, wherein the management system forms a management agent for remote management of a computer system.

18. A method for generating a management object model including a structured hierarchy of objects representing hardware components of a computer system for performing management of the computer system, the method comprising:
component modules defining mappings from instrumentation of the hardware components to objects representing those hardware components, wherein one of said component modules for a hardware component identifies an instrumentation module defining a source of instrumentation for the hardware component;
a general part of the instrumentation module communicating with a specific part of the instrumentation module via a private interface to obtain instrumentation data, and the specific part interfacing with instrumentation for the hardware component to obtain said instrumentation data; and
configuration modules configuring associations between the component modules for the generation of the management object model.

19. The method of claim 18, comprising the component modules defining mappings at respective different levels of abstraction.

20. The method of claim 19, comprising one of said component modules defining a mapping for a single hardware component property at a first level of abstraction.

21. The method of claim 19, comprising one of said component modules defining a mapping for a set of hardware component properties forming an object at a second level of abstraction.

22. The method of claim 19, comprising one of said component modules defining a mapping for an assembly of associated objects at a third level of abstraction.

23. The method of claim 18, comprising one of said component modules for a hardware component defining a behavior of the object representing the hardware component.

24. The method of claim 18, comprising one of said configuration modules configuring one of said component modules dynamically at run time for one of said hardware components that is subject to dynamic changes in status and monitoring said hardware component for a change in status.

25. The method of claim 18, comprising one of said configuration module configuring one of said component modules statically at run time for one of said hardware components having static properties for a given invocation of the computer system.

26. The method of claim 18, comprising one of said configuration modules configuring one of said component modules fixedly at run time for one of said hardware components having fixed properties for any invocation of the computer system.

27. The method of claim 18, comprising the instrumentation module exporting an object-based representation of the instrumentation data via an instrumentation interface.

28. The method of claim 18, wherein the general part and the specific part are local to each other.

29. The method of claim 18, wherein the specific part is remote from the general part, the general part being operable to communicate with the remote part via a remote access mechanism.

30. A computer readable storage medium comprising a computer program for generation of a management object model including a structured hierarchy of objects representing hardware components of a computer system for performing management of the computer system, the computer program including computer-executable instructions, which, when loaded onto the computer system comprising a processor and a memory, provide component modules operable to:
define mappings from instrumentation of the hardware components to objects representing those hardware components, wherein one of said component modules for a hardware component identifies an instrumentation module defining a source of instrumentation for the hardware component, and wherein the instrumentation module comprises a general part and a specific part, the general part being operable to communicate with the specific part via a private interface to obtain instrumentation data, and the specific part being configured to interface with instrumentation for the hardware component to obtain said instrumentation data;
wherein the computer-executable instructions further provide configuration modules operable to configure associations between the component modules for the generation of the management object model.

31. The computer readable storage medium of claim 30, wherein said component modules are operable to define mappings at respective different levels of abstraction.

32. The computer readable storage medium of claim 31, wherein one of said component modules is operable to define a mapping for a single hardware component property at a first level of abstraction.

33. The computer readable storage medium of claim 31, wherein one of said component modules is operable to define a mapping for a set of hardware component properties forming an object at a second level of abstraction.

34. The computer readable storage medium of claim 31, wherein one of said component modules is operable to define a mapping for an assembly of associated objects at a third level of abstraction.

\* \* \* \* \*

UNITED STATES PATENT AND TRADEMARK OFFICE
CERTIFICATE OF CORRECTION

| | | |
|---|---|---|
| PATENT NO. | : 7,665,071 B1 | Page 1 of 1 |
| APPLICATION NO. | : 10/733795 | |
| DATED | : February 16, 2010 | |
| INVENTOR(S) | : Roles et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1800 days.

Signed and Sealed this

Seventh Day of December, 2010

David J. Kappos
*Director of the United States Patent and Trademark Office*